US009481083B2

(12) United States Patent
Kanazawa et al.

(10) Patent No.: US 9,481,083 B2
(45) Date of Patent: Nov. 1, 2016

(54) MOTION TARGET GENERATING APPARATUS OF MOBILE ROBOT

(71) Applicant: HONDA MOTOR CO., LTD., Tokyo (JP)

(72) Inventors: Masao Kanazawa, Saitama (JP); Tomoki Watabe, Saitama (JP); Takumi Kamioka, Saitama (JP); Minami Asatani, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/797,311

(22) Filed: Jul. 13, 2015

(65) Prior Publication Data

US 2016/0016308 A1 Jan. 21, 2016

(30) Foreign Application Priority Data

Jul. 16, 2014 (JP) ................. 2014-146322

(51) Int. Cl.
  *G08G 1/123* (2006.01)
  *B25J 9/16* (2006.01)

(52) U.S. Cl.
  CPC ............. *B25J 9/1607* (2013.01); *Y10S 901/01* (2013.01); *Y10S 901/28* (2013.01); *Y10S 901/46* (2013.01)

(58) Field of Classification Search
  CPC ........ B25J 9/00; B25J 9/0003; B25J 9/0006; B25J 9/0015; B25J 9/0024; B25J 9/003; B25J 9/0033; B25J 9/0045; B25J 9/009; B25J 9/106; B25J 13/00; B25J 15/00; B25J 17/00
  USPC ......................... 700/263, 245, 248, 261, 900; 318/568.11, 568.12, 568.2; 701/12, 44, 701/57.68, 31.3, 411, 436, 445–448, 481, 701/480
  See application file for complete search history.

(56) References Cited

U.S. PATENT DOCUMENTS

| 5,355,064 A * | 10/1994 | Yoshino | B62D 57/032 180/8.1 |
| 5,404,086 A * | 4/1995 | Takenaka | B62D 57/032 318/568.11 |
| 2011/0098857 A1* | 4/2011 | Yoshiike | B62D 57/032 700/246 |
| 2011/0160906 A1* | 6/2011 | Orita | B62D 57/032 700/260 |
| 2011/0301756 A1* | 12/2011 | Yoshiike | B62D 57/032 700/253 |
| 2013/0144441 A1* | 6/2013 | Kanazawa | B25J 9/1607 700/263 |

FOREIGN PATENT DOCUMENTS

JP 2013-116529 6/2013

* cited by examiner

*Primary Examiner* — Muhammad Shafi
(74) *Attorney, Agent, or Firm* — Rankin, Hill & Clark LLP

(57) ABSTRACT

A motion target generating apparatus calculates the time series of motion accelerations of a base body 2 and the distal end portion of each of movable links 3 and 4 of a robot 1 at a plurality of times after a current time such that the value of a predetermined evaluation function is minimized in a range in which a joint motion constraint condition of each of the movable links 3 and 4 of the robot 1 is satisfied. Based on the calculated values of the motion accelerations at an initial time, new desired motion accelerations of the base body 2 and the distal end portion of each of the movable links 3 and 4 are determined. The desired value for controlling each joint of the robot 1 is determined on the basis of the desired motion accelerations.

5 Claims, 5 Drawing Sheets

TRAJECTORY OF DESIRED POSITION/
ATTITUDE OF FOOT PORTION OF
LEG LINK

MOTION TARGET GENERATING APPARATUS OF MOBILE ROBOT

BACKGROUND OF THE INVENTION

1. Field of the Invention

The present invention relates to a motion target generating apparatus of a mobile robot that has leg links.

2. Description of the Related Art

There has conventionally been proposed a variety of apparatuses adapted to generate motion targets of a mobile robot, such as a bipedal walking robot. For example, Japanese Patent Application Laid-Open No. 2013-116529 (hereinafter referred to as Patent Document 1) proposes an art whereby to sequentially generate, at a predetermined control processing cycle, a desired gait that defines the displacement amount of each joint of a mobile robot so as to enable the mobile robot to carry out a required motion (mobile motion) within a range in which the constraint condition of the motion state of each joint of the mobile robot is satisfied (the condition of a variable range of the displacement amount and the displacement velocity of each joint).

According to the prior art described in Patent Document 1, for each time at which a motion target of the robot is to be generated (at a predetermined control processing cycle), a motion target at each time is generated such that the motion target at that particular time satisfies the constraint condition of the motion state of each joint (hereinafter referred to as "the joint constraint condition" in some cases).

Hence, if a motion target is continually generated in a current pattern, then it is difficult to adjust the generation pattern of the motion target beforehand even in a situation in which there is a high possibility that the joint constraint condition will not be satisfied in the near future.

As a result, the generation pattern of the motion target easily changes. Hence, there has been a possibility of impairing a smooth generation pattern, which leads to impaired smoothness of the motion of the mobile robot.

SUMMARY OF THE INVENTION

The present invention has been made in view of the aforesaid background, and it is an object of the invention to provide an apparatus capable of properly generating a motion target that enables a mobile robot to smoothly move while satisfying the constraint condition of the motion state of each joint.

To this end, the present invention provides a motion target generating apparatus of a mobile robot adapted to sequentially generate, at a predetermined control processing cycle, a desired control value for controlling a motion of each joint of a mobile robot, which has a plurality of movable links, including a leg link extended from a base body, and in which a distal end portion of each of the movable links is configured to move relative to the base body by a motion of a joint provided in the movable link between the distal end portion and the base body, the motion target generating apparatus comprising: an estimated movable link distal end portion trajectory setting unit that sets an estimated movable link distal end portion trajectory, which is an estimated trajectory of a desired value of a motion state of the distal end portion of each of the movable links after a current time, at each control processing cycle;

an estimated overall momentum trajectory setting unit that sets an estimated overall momentum trajectory, which is an estimated trajectory of a desired value of an overall momentum of the mobile robot after the current time, at each control processing cycle;

an estimated overall motion state trajectory setting unit that temporarily determines, at each control processing cycle, an estimated overall motion state trajectory, which is an estimated trajectory of a desired value of an overall motion state of the mobile robot after the current time, such that the set estimated movable link distal end portion trajectory and the set estimated overall momentum trajectory can be implemented;

a motion acceleration determining unit that, at each control processing cycle, carries out arithmetic processing of a solution technique of a secondary plan problem by using a joint motion constraint condition, which is a predetermined constraint condition, which is related to the motion state of each joint of each of the movable links and which is not used in the processing by the estimated overall motion state trajectory determining unit, and a predetermined evaluation function related to a predetermined type of state amount of the mobile robot at a plurality of times after the current time so as to calculate motion accelerations of the base body and the distal end portion of each of the movable links at the plurality of times such that a value of the predetermined evaluation function is minimized within a range that satisfies the joint motion constraint condition, thereby determining new desired motion accelerations of the base body and the distal end portion of each of the movable links based on calculated values of the motion accelerations of the base body and the distal end portion of each of the movable links at an initial time among the plurality of times; and a desired joint control value determining unit that determines a desired control value of each joint of the mobile robot at each control processing cycle such that the determined desired motion accelerations are attained, wherein the predetermined evaluation function is an evaluation function configured such that the value thereof changes according to the degree of agreement between a time series of the predetermined type of state amount at the plurality of times calculated using motion velocities of the base body and the distal end portion of each of the movable links defined by the calculated values of the motion accelerations at the plurality of times and a Jacobian matrix defined by the estimated overall motion state trajectory and a time series of the predetermined type of state amount at the plurality of times defined by the estimated overall motion state trajectory, and the joint motion constraint condition is a constraint condition expressed by an inequality that defines a variable range of the motion state of each joint of each of the movable links calculated using the motion velocities of the base body and the distal end portion of each of the movable links defined by the calculated values of the motion accelerations at the plurality of times and the Jacobian matrix defined by the estimated overall motion state trajectory (a first aspect of the invention).

In the present invention, the motion state of the base body means any one of or a plurality of state amounts among the position and the attitude of the base body, the motion velocity of the base body as the temporal change rate of the position and the attitude, and the motion acceleration as the temporal change rate of the motion velocity of the base body. The same applies to the motion state of the distal end portion of each of the movable links.

Further, the motion state of each joint means any one of or a plurality of state amounts among the displacement amount of the joint, the displacement velocity as the temporal change rate of the displacement amount, and the displacement acceleration as the temporal change rate of the displacement velocity.

Further, the overall momentum of the mobile robot means the momentum or the momenta of one or both of the overall translational momentum and the overall angular momentum of the mobile robot.

Further, the overall motion state of the mobile robot means a state amount that makes it possible to define the position and the attitude of any portion of the mobile robot (e.g. a set of the position and the attitude of the base body and the displacement amount of any joint of the mobile robot).

According to the first aspect of the invention, at each control processing cycle for generating the desired control value of each joint of the mobile robot (e.g. the desired displacement amount or the desired displacement velocity of each joint), the estimated overall motion state trajectory is temporarily determined such that the estimated movable link distal end portion trajectory and the estimated overall motion amount trajectory, which have been set, can be attained.

The estimated overall motion state trajectory makes it possible to attain the estimated movable link distal end portion trajectory and the estimated overall motion amount trajectory after the current time. However, the estimated overall motion state trajectory is determined without using (considering) the predetermined constraint condition related to the motion state of the joint of each movable link (the joint motion constraint condition). Therefore, the estimated overall motion state trajectory does not necessarily satisfy the predetermined constraint condition.

As the technique for determining the estimated overall motion state trajectory, the technique of resolved momentum control, for example, may be used.

Further, the motion accelerations of the base body and the distal end portion of each movable link at a plurality of times after the current time are calculated by the arithmetic processing of the solution technique of the secondary plan problem such that the value of the predetermined evaluation function related to the predetermined type of state amount of the mobile robot at the plurality of times after the current time is minimized within a range in which the joint motion constraint condition is satisfied.

The predetermined evaluation function is a function for evaluating the degree of agreement between the time series of the value of the predetermined type of state amount defined according to the time series of the calculated value of the motion acceleration at the plurality of times determined by the arithmetic processing of the solution technique of the secondary plan problem (the solution of the secondary plan problem) and the time series of the value of the predetermined type of state amount defined by the estimated overall motion state trajectory. As the degree of agreement increases, the value of the evaluation function decreases.

The predetermined type of state amount may be selected by experiments, simulations or the like in advance such that an ideal desired control value can be determined in accomplishing a desired motion of the mobile robot.

In the present invention, the predetermined evaluation function is, more specifically, defined as an evaluation function configured such that the value thereof changes according to the degree of agreement between the time series of the predetermined type of state amount at the plurality of times calculated using motion velocities of the base body and the distal end portion of each of the movable links defined by the calculated values of the motion acceleration at the plurality of times and a Jacobian matrix defined by the estimated overall motion state trajectory and a time series of the predetermined type of state amount at the plurality of times defined by the estimated overall motion state trajectory.

Further, the joint motion constraint condition is a constraint condition expressed by an inequality that defines a variable range of the motion state of each joint of each of the movable links calculated using the motion velocities of the base body and the distal end portion of each of the movable links defined by the calculated value of the motion acceleration at the plurality of times and the Jacobian matrix defined by the estimated overall motion state trajectory.

Thus, in the arithmetic processing of the solution technique of the secondary plan problem at each control processing cycle, the predetermined type of state amount at each of the plurality of times and the motion state of each joint of each of the movable links can be calculated using a fixed Jacobian matrix defined by the estimated overall motion state trajectory. Hence, the processing of calculating the motion acceleration by the arithmetic processing of the solution technique of the secondary plan problem can be efficiently completed in a shorter time.

In this case, the trajectory of the overall motion state of the robot defined by the calculated value of the motion acceleration at the plurality of times determined by the arithmetic processing of the solution technique of the secondary plan problem and the estimated overall motion state trajectory may not agree with each other due to the joint motion constraint condition. Generally, however, a significant difference between the two trajectories is unlikely to take place at a time closer to the current time among the plurality of times.

Accordingly, at the time closer to the current time among the plurality of times, the predetermined type of state amount of an object to be evaluated on the basis of the evaluation function and the motion state of each joint of each of the movable links to which the joint motion constraint condition is applied can be calculated with high reliability by using the Jacobian matrix defined by the estimated overall motion state trajectory.

Further, the motion accelerations (the motion accelerations of the base body and the distal end portion of each of the movable links) at the plurality of times are calculated such that the joint motion constraint condition at the plurality of times is satisfied. This makes it possible to calculate the motion accelerations such that the joint motion constraint condition continues to be satisfied in the near future after the current time.

Further, at each control processing cycle, the new desired motion accelerations of the base body and the distal end portion of each of the movable links are determined on the basis of the calculated values of the motion accelerations of the base body and the distal end portion of each of the movable links at an initial time (a time closer to the current time) among the plurality of times after the current time.

With this arrangement, the new desired motion accelerations of the base body and the distal end portion of each of the movable links can be determined at each control processing cycle while obviating the occurrence of a situation in which the motion state of the joint of any one of the movable links no longer satisfies the joint motion constraint condition in the near future after the current time. Further, the processing of the determination can be efficiently carried out in a shorter time by using the Jacobian matrix, which is defined by the estimated overall motion state trajectory, in the processing of the determination.

Further, in the first aspect of the invention, the desired control value of each joint of the mobile robot in each control processing cycle is determined such that the desired motion accelerations determined as described above are attained.

Thus, the first aspect of the invention makes it possible to determine, at each control processing cycle, the desired control value of each joint such that the situation in which the motion state of the joint of any one of the movable links no longer satisfies the joint motion constraint condition in the near future after the current time is obviated, and the processing of the determination can be efficiently carried out in a shorter time.

Hence, according to the first aspect of the invention, a motion target that enables the mobile robot to smoothly move can be properly generated while satisfying the constraint condition of the motion state of each joint (the joint motion constraint condition).

According to various experiments and studies by the present inventors, preferably, the predetermined type of state amount includes at least the overall momentum of the mobile robot and the predetermined evaluation function is configured such that the value thereof changes according to a momentum evaluation index value indicative of a degree of agreement between a time series of the overall momentum of the mobile robot at the plurality of times calculated using the motion velocities of the base body and the distal end portion of each of the movable links, which are defined by the calculated values of the motion accelerations at the plurality of times, and a Jacobian matrix defined by the estimated overall motion state trajectory, and a time series of a desired value of the momentum at the plurality of times defined by the estimated overall momentum trajectory (a second aspect of the invention).

The estimated overall motion state trajectory is adapted to attain the estimated overall momentum trajectory. In other words, therefore, the time series of the desired value of the overall momentum of the mobile robot at the plurality of times defined by the estimated overall momentum trajectory corresponds to the time series of the momentum at the plurality of times defined by the estimated overall motion state trajectory.

The second aspect of the invention makes it possible to calculate the motion accelerations of the base body and the distal end portion of each of the movable links such that the degree of agreement related to the time series of the momentum at the plurality of times after the current time is maximized (with a consequently decreased value of the evaluation function) within a range in which the constraint condition of each joint of each of the movable links is satisfied.

In the second aspect of the invention described above, further preferably, the predetermined type of state amount further includes motion accelerations of the base body and the distal end portion of each of the movable links, and the predetermined evaluation function is configured such that the value thereof changes according to a motion acceleration evaluation index value indicative of a degree of agreement between a time series of the calculated values of the motion accelerations of the base body and the distal end portion of each of the movable links at the plurality of times and a time series of the motion accelerations at the plurality of times defined by the estimated overall motion state trajectory, and the momentum evaluation index value (a third aspect of the invention).

The third aspect of the invention makes it possible to calculate the motion accelerations of the base body and the distal end portion of each of the movable links such that both the degree of agreement related to the time series of the momentum at the plurality of times after the current time and the degree of agreement related to the motion accelerations of the base body and the distal end portion of each of the movable links are maximized (with a consequently decreased value of the evaluation function) within a range in which the constraint condition of each joint of each of the movable links is satisfied.

Further, in the second aspect of the invention, preferably, the estimated overall momentum trajectory setting unit includes a unit that sets an estimated trajectory of a desired ZMP of the mobile robot after the current time, and the overall momentum of the mobile robot that constitutes the predetermined type of state amount includes an angular momentum about a desired ZMP of the mobile robot (a fourth aspect of the invention). The same applies to the third aspect of the invention described above (a fifth aspect of the invention).

The desired ZMP means the desired position of a zero moment point (ZMP).

According to the fourth aspect of the invention or the fifth aspect of the invention, the motion target (the desired joint control value for controlling the motion of each joint) of the mobile robot can be determined to enable the mobile robot to perform a dynamically proper motion.

DESCRIPTION OF THE PREFERRED EMBODIMENTS

Figure 1:
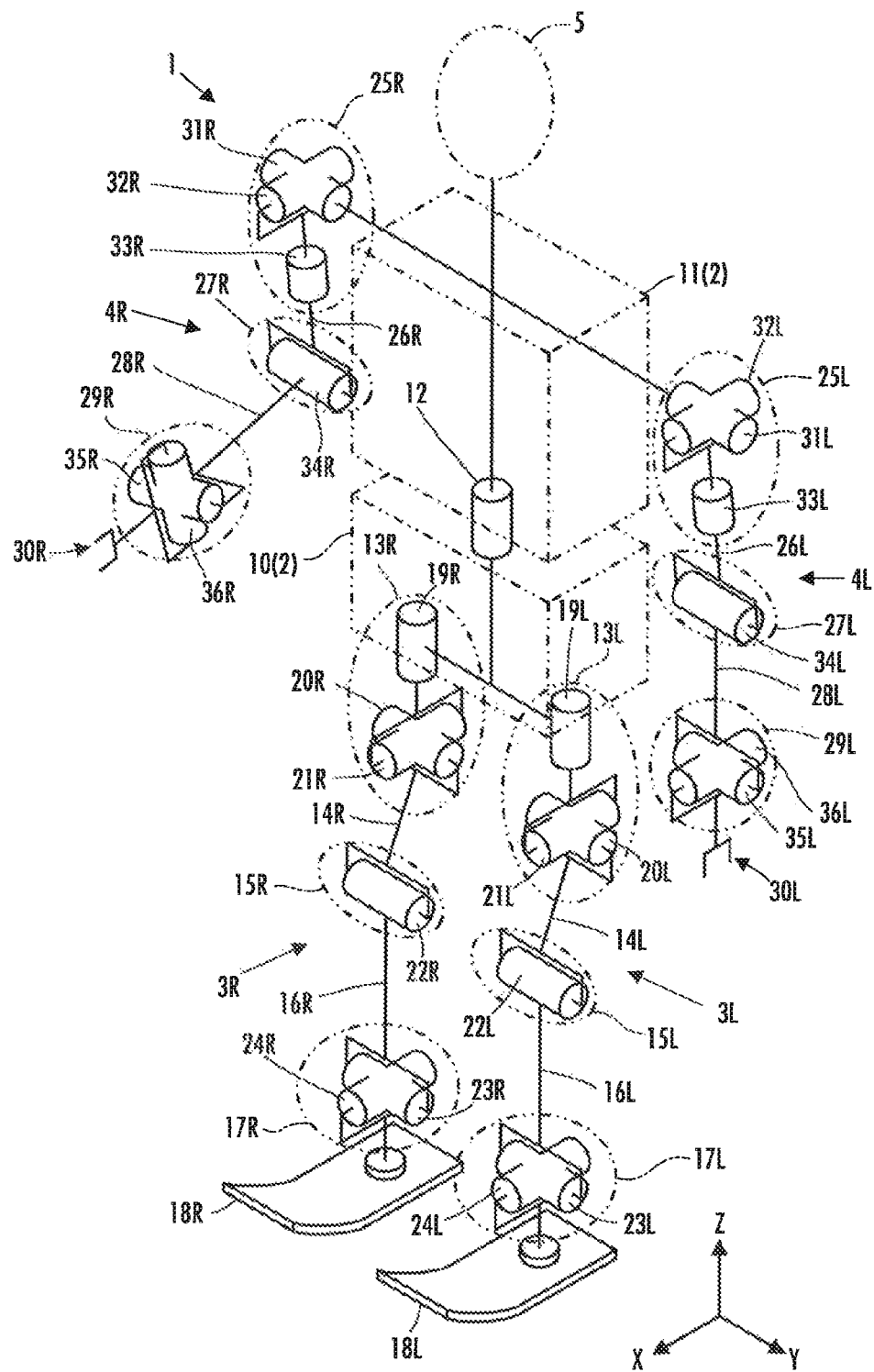
FIG. 1 is a diagram illustrating a schematic configuration of a mobile robot according to an embodiment of the present invention.

An embodiment of the present invention will be described with reference to FIG. 1 to FIG. 6. FIG. 1 schematically illustrates the rough configuration of a mobile robot exemplified in the present embodiment. A mobile robot 1 (hereinafter referred to simply as "the robot 1") is a humanoid mobile robot that has a base body 2, a plurality of (four in the present embodiment) movable links 3L, 3R, 4L, and 4R, which extend from the base body 2, and a head 5.

The movable links 3L and 3R among the four movable links 3L, 3R, 4L and 4R are movable links corresponding to a pair of left and right leg links, and the movable links 4L and 4R are movable links corresponding to a pair of left and right arm links.

In the drawings, reference character "L" denotes constituent elements on the left side of the robot 1 and "R" denotes constituent elements on the right side thereof. In the following description, however, the reference characters "L" and "R" will be omitted if there is no need to distinguish between the left and the right. Further, the movable links 3L and 3R may be referred to as the leg links 3L and 3R (or the leg links 3), and the movable links 4L and 4R may be referred to as the arm links 4L and 4R (or the arm links 4).

Further, the movable links 3L, 3R, 4L, and 4R may be referred to as the first movable link, the second movable link, the third movable link and the fourth movable link in this order, and any one of the movable links may be referred to as an i-th movable link (i=1, 2, 3 or 4).

The base body 2 is a link portion corresponding to the upper body of the robot 1. The base body 2 in the present embodiment is constructed of two element links, namely, a lower base body 10 and an upper base body 11 disposed above the lower base body 10, and a joint 12 that connects the lower base body 10 and the upper base body 11. The joint 12 has a degree of freedom of rotation about a yaw axis (about a Z-axis). Hereinafter, the joint 12 may be referred to as the base body joint 12.

The leg links 3L and 3R among the movable links 3L, 3R, 4L and 4R share the same construction. To be specific, each of the leg links 3 is provided with a thigh portion 14 connected to the lower base body 10 through the intermediary of a hip joint portion 13, a crus portion 16 connected to the thigh portion 14 through the intermediary of a knee joint portion 15, and a foot portion 18 connected to the crus portion 16 through the intermediary of an ankle joint portion 17, as element links constituting the leg link 3. The foot portion 18 is the element link constituting the distal end portion of the leg link 3.

In this case, the hip joint portion 13 is constructed of three joints 19, 20 and 21, which have the degree of freedom of rotation about the yaw axis (about the Z-axis), about a pitch axis (about a Y-axis), and about a roll axis (about an X-axis), respectively. Further, the knee joint portion 15 is composed of a joint 22 that has the degree of freedom of rotation about the pitch axis. Further, the ankle joint portion 17 is composed of two joints 23 and 24, which have the degree of freedom of rotation about the pitch axis and the roll axis, respectively.

Thus, the distal end portion (the foot portion 18) of each of the leg links 3 in the present embodiment has six degrees of motional freedom with respect to the lower base body 10. The axes of rotation (the roll axis, the pitch axis and the yaw axis) of the joints 19 to 24 of each of the leg links 3 in the above description indicate the axes of rotation in a state in which the leg links 3 are extended in the vertical direction. Further, the X-axis, the Y-axis, and the Z-axis denote the coordinate axes of a three-axis orthogonal coordinate system illustrated in FIG. 1.

The arm links 4R and 4L among the movable links 3L, 3R, 4L and 4R share the same configuration. To be specific, each of the arm links 4 is provided with an upper arm portion 26 connected to the upper base body 11 through the intermediary of a shoulder joint portion 25, a forearm portion 28 connected to the upper arm portion 26 through the intermediary of an elbow joint portion 27, and a hand 30 connected to the forearm portion 28 through the intermediary of a wrist joint portion 29, as element links constituting the arm link 4. The hand 30 is the element link constituting the distal end portion of the arm link 4.

In this case, the shoulder joint portion 25 is constructed of three joints 31, 32 and 33, which have the degree of freedom of rotation about the pitch axis, about the roll axis and the yaw axis, respectively. Further, the elbow joint portion 27 is composed of a joint 34 which has the degree of freedom of rotation about the pitch axis. Further, the wrist joint portion 29 is composed of two joints 35 and 36, which have the degree of freedom of rotation about the pitch axis and the roll axis, respectively.

Thus, the distal end portion (the hand 30) of each of the arm links 4 in the present embodiment has six degrees of motional freedom with respect to the upper base body 11. The axes of rotation (the roll axis, the pitch axis and the yaw axis) of the joints 31 to 37 of each of the arm links 4 in the above description indicate the axes of rotation in a state in which the arm links 4 are extended in the vertical direction.

The head 5 is disposed above the upper base body 11 and fixed to the upper base body 11. Alternatively, however, the head 5 may be connected to the upper base body 11 through the intermediary of a joint so as to enable the head 5 to, for example, tilt or pan. In such a case, the head 5 may be regarded as a movable link extended from the base body 2.

The robot 1 having the configuration described above drives the six joints 19 to 24 of each of the leg links 3 thereby to carry out the spatial motion of each of the leg links 3. The motion enables the robot 1 to move on a floor. For example, moving the leg links 3R and 3L in a form (gait) similar to the walking motion or the running motion of a person enables the robot 1 to carry out the walking motion or the running motion.

Further, the spatial motion of each of the arm links 4 is carried out by driving the six joints 31 to 36 of each of the arm links 4. The motion makes it possible to perform a job of, for example, moving the hand 30 of each of the arm links 4 to come in contact with an appropriate object.

Further, it is possible to cause the arm link 4 to function as a leg link by bringing the distal end portion of the arm link 4 into contact with the ground (a floor).

Further, in the present embodiment, the lower base body 10 and the upper base body 11 constituting the base body 2 are connected through the intermediary of the base body joint 12. The base body 2 can be twisted about the rotational axis of the base body joint 12, which corresponds to the body trunk axis thereof, by driving the base body joint 12.

Figure 2:
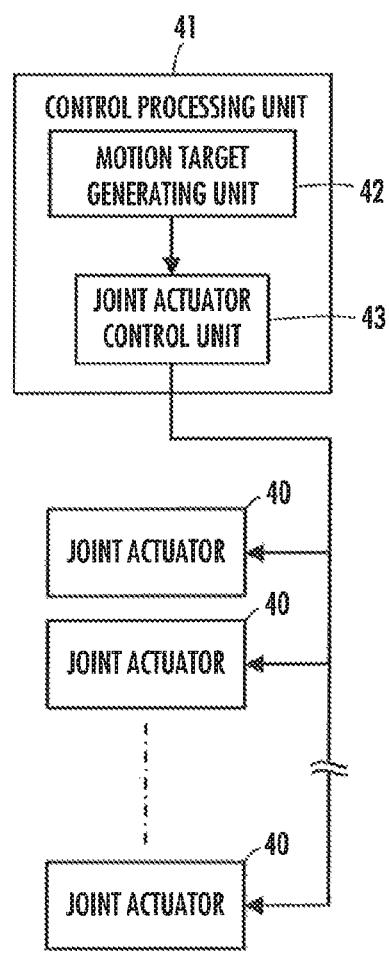
FIG. 2 is a block diagram illustrating a configuration related to the control of the mobile robot according to the embodiment.

Although not illustrated in FIG. 1, the robot 1 includes joint actuators 40 which rotatively drive the foregoing joints and a control processing unit 41 which controls the motion of the robot 1, as illustrated in FIG. 2.

Each of the joint actuators 40 is constituted of, for example, an electric motor or a hydraulic actuator and provided for each joint. In this case, the mechanisms for driving the joints by the joint actuator 40 may have a publicly known structure. Further, the joint actuators 40 are not limited to rotary actuators and may be direct acting type actuators.

The control processing unit 41 is constituted of an electronic circuit unit, which includes a CPU, a RAM, a ROM, an interface circuit and the like. The control processing unit 41 has, as major functions implemented by an installed program and a hardware configuration, a motion target generating unit 42, which sequentially generates a motion target (a desired control value for controlling the motion of each joint) of the robot 1, and a joint actuator control unit 43, which controls each of the joint actuators 40 of the robot 1 according to the motion target.

The motion target generating unit 42 is adapted to impart the function as the motion target generating apparatus in accordance with the present invention to the control processing unit 41. The motion target generating unit 42 carries out the processing for sequentially determining, at a predetermined control processing cycle, the desired value of the displacement amount of each joint (hereinafter referred to as "the desired displacement amount" or "the desired joint displacement amount") as the desired control value for controlling the motion of each joint of the robot 1 (the motion target of the robot 1).

The joints of the robot 1 in the present embodiment are rotary joints. Accordingly, the displacement amounts of the joints are indicated in the rotational angles of the joints.

The joint actuator control unit 43 controls the joint actuator 40 corresponding to each joint such that the actual displacement amount of each joint follows a desired displacement amount determined by the motion target generating unit 42.

In this case, the actual displacement amount (rotational angle) of each joint is detected by a displacement amount sensor, such as a rotary encoder, which is mounted on the robot 1 and which is not illustrated. Further, the joint actuator control unit 43 controls the driving force of the joint actuator 40 by feedback control (servo control) according to the difference between the detection value of an actual displacement amount of each joint and a desired joint displacement amount.

The processing by the motion target generating unit 42 and the processing by the joint actuator control unit 43 are concurrently carried out. In other words, the processing for generating a motion target of the robot 1 is carried out in real time while controlling the actual motion of the robot 1.

The following will specifically describe the processing by the motion target generating unit 42 of the control processing unit 41.

The terms and the like used in the present embodiment will be supplementarily described. The "position" of each portion (integral portion) of the robot 1, such as the distal end portion (the foot portion 18 or the hand 30) of each of the movable links 3 or 4, and the lower base body 10, means the spatial position of a representative point of the portion defined in advance, and the "attitude" of the portion means the spatial orientation of the portion.

The "position" and the "attitude" of each portion will be expressed by the position and the attitude, respectively, observed in a global coordinate system (an inertial coordinate system) arbitrarily set in the operational environment of the robot 1. As the global coordinate system, an XYZ orthogonal coordinate system, for example, is used, in which two horizontal axes orthogonal to each other are defined as the X-axis and the Y-axis and a vertical axis orthogonal thereto is defined as the Z-axis, as illustrated in FIG. 1.

In this case, the "position" of each portion will be expressed as a three-component vector formed of the positional components in the axial directions of the global coordinate system. Similarly, the "attitude" of each portion will be expressed by a three-component vector formed of an angular component (e.g. an angular component expressed by Euler angle) about the axes of the global coordinate system.

Further, the temporal change rates of the "position" and the "attitude" of each portion will be referred to as the motion velocity of the portion, and the temporal change rate of the motion velocity of each portion will be referred to as the motion acceleration of the portion. The motion velocity and the motion acceleration related to the "position" will mean the translational velocity and the translational acceleration, respectively, and the motion velocity and the motion acceleration related to the "attitude" will mean the angular velocity and the angular acceleration. Each of the translational velocity, the translational acceleration, the angular velocity and the angular acceleration will be expressed by a three-component vector observed in the global coordinate system. The same will apply to the momentum (the translational momentum and the angular momentum).

Further, the temporal change rate of the displacement amount of each joint of the robot 1 will be referred to as the displacement velocity of the joint, and the temporal change rate of the displacement velocity of each joint will be referred to as the displacement acceleration of the joint.

In the present embodiment, the base body 2 is constituted of the lower base body 10 and the upper base body 11, and the base body joint 12. It should be noted that the positon and the attitude of the base body 2 are constituted of the position and the attitude of a base body reference portion (e.g. the lower base body 10), which is either the lower base body 10 or the upper base body 11, and the displacement amount of the base body joint 12.

Similarly, the motion velocity of the base body 2 is constituted of the motion velocity of the base body reference portion and the displacement velocity of the base body joint 12, and the motion acceleration of the base body 2 is constituted of the motion acceleration of the base body reference portion and the displacement acceleration of the base body joint 12.

The position, the attitude, the motion velocity and the motion acceleration of each portion or the displacement amount, the displacement velocity and the displacement acceleration of each joint may be generically referred to as "the motion state" of the portion or the joint.

Further, the "trajectory" of an arbitrary state amount, such as the position, the attitude, the motion velocity, the motion acceleration and the momentum, or the displacement amount, the displacement velocity and the displacement acceleration or the like of each joint will mean the time series of the instantaneous value of the amount of state.

Further, a symbol "↑" will be used to denote a vector (longitudinal vector).

Further, a superscript suffix "T" attached to a variable that indicates an arbitrary vector or matrix will mean the transposition of the vector or the matrix.

The processing by the motion target generating unit 42 will now be schematically described. The motion target generating unit 42 sets, at each predetermined control processing cycle, the estimated trajectory of a desired value of the motion state of the distal end portion of each of the movable links 3 and 4 after a current time and the estimated trajectory of a desired value of the overall momentum (the translational momentum and the angular momentum) of the robot 1 after the current time.

Then, the motion target generating unit 42 generates the estimated overall motion state trajectory, which is the estimated trajectory of the desired values of the overall motion state of the robot 1 (specifically, the desired values that define the position and the attitude of each portion of the robot 1 and the displacement amount of each joint) after the current time, such that the foregoing estimated trajectories are implemented.

The estimated overall motion state trajectory is a temporary reference trajectory generated without considering the constraint condition related to the motion state of each joint (hereinafter referred to as "the joint motion constraint condition"), such as the variable range of the displacement amount of each joint of the robot 1, (regarding that there is no such joint motion constraint condition). Accordingly, there are some cases where the estimated overall motion state trajectory does not satisfy the joint motion constraint condition.

Further, the motion target generating unit 42 uses the Jacobian matrix defined by the estimated overall motion state trajectory, a predetermined evaluation function related to a predetermined type of state amount of the robot 1, and an inequality that expresses the joint motion constraint condition to carry out the arithmetic processing of the solution technique of a secondary plan problem, thereby calculating the time series of the motion accelerations of the base body 2 of the robot 1 and the distal end portion of each of the movable links 3 and 4 (the first to the fourth movable links) thereof after the current time (the time series of the instantaneous value of the motion accelerations at a plurality of times for each predetermined interval time $\Delta T$).

The time series (trajectories) of the motion accelerations are calculated such that the degree of agreement between the time series of the value of the predetermined type of state amount of the robot 1, which is calculated on the basis of the motion velocity defined by the time series of the motion accelerations (the motion velocities of the base body 2 and the distal end portion of each of the movable links 3 and 4) and the Jacobian matrix defined by the estimated overall motion state trajectory, and the time series of the value of the predetermined type of state amount, which is defined by the estimated overall motion state trajectory, is maximized within a range in which the joint motion constraint condition is satisfied.

Further, the desired motion accelerations of the base body 2 of the robot 1 and the distal end portion of each of the movable links 3 and 4 to be determined at a current control processing cycle (the desired motion accelerations for the actual control of the robot 1) are determined on the basis of a calculated value at initial time (current time in the present embodiment) in the time series of the calculated values of the foregoing motion accelerations.

Thus, the desired motion accelerations of the base body 2 and the distal end portion of each of the movable links 3 and 4 are determined at each control processing cycle.

Then, based on the desired motion accelerations, the motion target generating unit 42 determines the desired control values of the position and the attitude of the base body 2 and the desired control values of the position and the attitude of the distal end portion of each of the movable links 3 and 4 at each control processing cycle.

Further, the motion target generating unit 42 determines the desired displacement amount for the actual control of each joint of the robot 1 (the desired displacement amount used by the joint actuator control unit 43) at each control processing cycle by applying inverse kinematics computation on the basis of the above desired control values.

Figure 3:
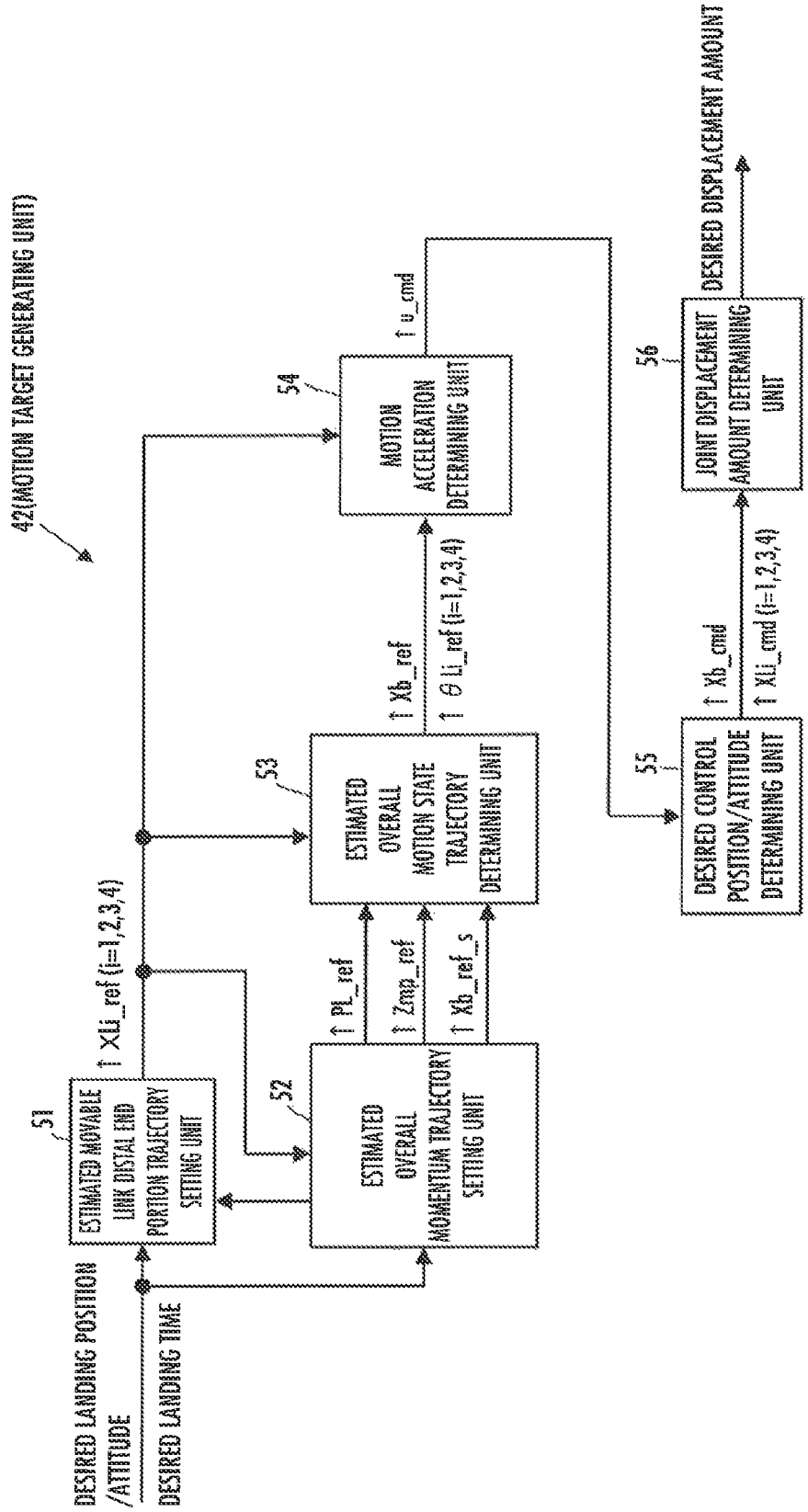
FIG. 3 is a block diagram illustrating the function of a motion target generating unit illustrated in FIG. 2.

The motion target generating unit 42, which carries out the processing, is provided with a processing section illustrated in the block diagram of FIG. 3 as a major processing section.

More specifically, the motion target generating unit 42 has an estimated movable link distal end portion trajectory setting unit 51, which sets, at a predetermined control processing cycle, an estimated movable link distal portion trajectory, which is an estimated trajectory of the desire values ↑XL1_ref, ↑XL2_ref, ↑XL3_ref and ↑XL4_ref of the motion states ↑XL1, ↑XL2, ↑XL3 and ↑XL4 of the distal end portion (the foot portion 18 or the hand 30) of each of the movable links 3L, 3R, 4L and 4R after the current time, and an estimated overall momentum trajectory setting unit 52, which sets, at a predetermined control processing cycle, the estimated overall momentum trajectory, which is an estimated trajectory of a desired value ↑PL_ref of an overall momentum ↑PL (a translational momentum and an angular momentum) of the robot 1 after the current time.

The estimated movable link distal end portion trajectory and the estimated overall momentum trajectory denote the time series of the instantaneous value at the time of each predetermined interval time $\Delta T$ from the current time. This applies to other estimated trajectories, which will be discussed hereinafter. The interval time $\Delta T$ is the same as, for example, time $\Delta t$ of the control processing cycle of the motion target generating unit 42. Alternatively, however, $\Delta T$ may be different from $\Delta t$, and may be, for example, larger than $\Delta t$ ($\Delta T > \Delta t$).

In the present embodiment, a desired value ↑XLi_ref of the motion state ↑XLi (instantaneous value) of the distal end portion of each of the movable links 3 and 4 (the i-th movable link) in the estimated movable link distal end portion trajectory indicates the desired value of the position and the attitude of the distal end portion of the i-th movable link. Hereinafter, the desired value ↑XLi_ref (i=1 to 4) of the position and the attitude of the distal end portion of each of the movable links 3 and 4 (the i-th movable link) will be referred to as desired position/attitude ↑XLi_ref.

The desired position/attitude ↑XLi_ref of the distal end portion of each of the movable links 3 and 4 is expressed as a six-component vector, in which the desired values of three components related to position (the positional components in the directions of the individual coordinate axes of the global coordinate system) and the desired values of three components related to attitude (the angular components in the directions of the individual coordinate axes of the global coordinate system) are arranged.

Supplementarily, the estimated movable link distal end portion trajectory setting unit 51 may set, as the estimated movable link distal end portion trajectory, the estimated trajectory of the desired value of the motion velocity (the temporal change rates of the position and the attitude) of the distal end portion or the estimated trajectory of the desired value of the motion acceleration (the temporal change rate of the motion velocity) of the distal end portion in place of the estimated trajectory of the desired position/attitude ↑XLi_ref of the distal end portion of each of the movable links 3 and 4.

Even when the estimated trajectory of the desired value of the motion velocity or the motion acceleration of the distal end portion of each of the movable links 3 and 4 is set, the desired position/attitude ↑XLi_ref of the distal end portion of each of the movable links 3 and 4 can be calculated as necessary by integrating the desired value. Conversely, the desired value of the motion velocity or the motion acceleration of the distal end portion can be calculated by differentiating the desired position/attitude ↑XLi_ref (determining the temporal change rate) of the distal end portion of each of the movable links 3 and 4.

More specifically, a desired value ↑PL_ref of the overall momentum ↑PL of the robot 1 in the estimated overall momentum trajectory (hereinafter referred to as "the desired overall momentum ↑PL") is composed of a desired translational momentum ↑P_ref, which is the desired value of the overall translational momentum ↑P of the robot 1 (in other words, the translational momentum IP of the overall center of gravity of the robot 1), and a desired angular momentum ↑L_ref, which is the desired value of the overall angular momentum ↑L of the robot 1.

In the present embodiment, the desired angular momentum ↑L_ref is specifically the desired value of the angular momentum generated about a desired ZMP↑Zmp_ref, which is the desired value of a zero moment point (ZMP) of the robot 1.

Further, in the present embodiment, the desired overall momentum ↑PL is set using the desired ZMP ↑Zmp_ref and a dynamics model of the robot 1.

In the present embodiment, therefore, the estimated overall momentum trajectory setting unit 52 sets the estimated trajectory of the desired ZMP ↑Zmpref in addition to the estimated trajectory of the desired overall momentum ↑PL.

Further, according to the present embodiment, the estimated overall momentum trajectory setting unit 52 also has a function for setting the estimated trajectory of basic desired values ↑Xb_ref_s of the position and the attitude of the base body 2, including the displacement amount of the base body joint 12. The basic desired value ↑Xb_ref_s is a referential desired value set such that the desired ZMP ↑Zmp_ref is attained on the dynamics model used for setting the desired overall momentum ↑PL.

The desired translational momentum ↑P_ref, the desired angular momentum ↑L_ref, and the desired ZMP ↑Zmpz_ref are all expressed as three-component vectors observed in the global coordinate system. Further, the desired overall momentum ↑PL_ref, which combines ↑P_ref and ↑L_ref, is expressed as a six-component vector $(=[P\_ref^T, \uparrow L\_ref^T]^T$.

Further, the basic desired value ↑Xb_ref_s of the position and the attitude ↑Xb of the base body 2 (hereinafter referred to as "the basic desired position/attitude ↑Xb_ref_s") is expressed as a seven-component vector $(=[\uparrow Xbb\_ref\_s^T, \theta f\_ref\_s]^T)$ composed of the basic desired value ↑Xbb_ref_s of the position and the attitude (the six-component vector ↑Xbb observed in the global coordinate system) of the base body reference portion (the lower base body 10 or the upper base body 11) and a basic desired value θf_ref_s of a displacement amount (rotational angle) θf of the base body joint 12.

The motion target generating unit 42 further includes an estimated overall motion state trajectory determining unit 53, which uses the estimated trajectories of ↑XLi_ref (i=1 to 4), ↑PL_ref, ↑Zmp_ref and ↑Xb_ref_s to determine an estimated overall motion state trajectory, which is an estimated trajectory of the desired value of the overall motion state of the robot 1 after the current time, such that a desired value ↑XLdoti_ref (i=1 to 4) of a motion velocity ↑XLdoti of the distal end portion of each of the movable links 3 and 4 (the i-th movable link), which is defined by the estimated trajectory of ↑XLi_ref (i=1 to 4), and the desired overall momentum ↑PL_ref are attained.

The desired value of the overall motion state of the robot 1 in the estimated overall motion state trajectory is composed of the desired value ↑Xb_ref of the position and the attitude ↑Xb of the base body 2 and a desired value ↑θLi_ref of a displacement amount ↑θLi (i=1 to 4) of the joint of each of the movable links 3 and 4 (the first to the fourth movable links).

In this case, as with the basic desired position/attitude ↑Xb_ref_s, the desired value ↑Xb_ref of the position and the attitude ↑Xb of the base body 2 (hereinafter referred to as "the desired position/attitude ↑Xb_ref") is expressed as a seven-component vector $(=[\uparrow Xbb\_ref^T, \theta f\_ref]^T)$ constituted of the desired value of the position and the attitude of the base body reference portion ↑Xbb_ref (six-component vector) and the desired value of the displacement amount (rotational angle) θf_ref of the base body joint 12.

Further, the desired value ↑θLi_ref of the displacement amount ↑θLi (i=1 to 4) of each joint of the movable links 3 and 4 (the first to the fourth movable links) (hereinafter referred to as "the desired joint displacement amount ↑θLi_ref") is expressed as a vector (a six-component vector in the present embodiment) that indicates a set of the desired values of the displacement amounts (rotational angles) of all the joints of each of the movable links 3 and 4 (the i-th movable link).

The motion target generating unit 42 further includes a motion acceleration determining unit 54, which uses the Jacobian matrix defined by the overall motion state of the robot 1 of the estimated overall motion state trajectory at each time of the estimated overall motion state trajectory, a predetermined evaluation function related to a predetermined type of state amount of the robot 1, and an inequality that expresses the joint motion constraint condition of the robot 1 to carry out the arithmetic processing of the solution technique of the secondary plan problem, thereby calculating the values of a motion acceleration ↑u $(=[\uparrow Xbdot2^T, \uparrow XL1dot2^T, \uparrow XL2dot2^T, \uparrow XL3dot2^T, \uparrow XL4dot2^T]^T$, which is composed of a set of a motion acceleration ↑Xbdot2 of the base body 2 of the robot 1 and a motion acceleration ↑XLidot2 (i=1 to 4) of the distal end portion of each of the movable links 3 and 4 (the first to the fourth movable links) at a plurality of times after the current time and determines, based on the calculation result, a desired motion acceleration ↑u_cmd $(=[\uparrow Xbdot2\_cmd^T, \uparrow XL1dot2\_cmd^T, \uparrow XL2dot2\_cmd^T, \uparrow XL3dot2\_cmd^T, \uparrow XL4dot2\_cmd^T]^T$ at each control processing cycle, a desired control position/attitude determining unit 55, which carries out integral computation on the desired motion acceleration ↑u_cmd determined at each control processing cycle so as to determine the desired control value ↑Xb_cmd of the position and the attitude of the base body 2 of the robot 1 and the desired control value ↑XLi_cmd (i=1 to 4) of the distal end portion of each of the movable links 3 and 4 at each control processing cycle, and a joint displacement amount determining unit 56, which determines the desired displacement amount of each joint of the robot 1 by the inverse kinematics computation from the desired control values ↑Xb_cmd and ↑XLi_cmd (i=1 to 4).

Supplementarily, the foregoing estimated trajectories (the estimated trajectories of state amounts with the suffix "_ref"), such as the estimated movable link distal end portion trajectory and the estimated overall motion state trajectory, are reference trajectories for reference (temporary trajectories) for determining the final desired displacement amount (the desired displacement amount for control, which is actually used by the joint actuator control unit 43) of each joint of the robot 1 at the time (current time) of each control processing cycle. Therefore, these estimated trajectories do not always agree with the trajectories of the desired values for the actual control of the robot 1 after the current time. In the present embodiment, the desired values used for controlling the actual motion of each joint of the robot 1 indicate the desired values with the suffix "_cmd."

The estimated movable link distal end portion trajectory setting unit 51, the estimated overall momentum trajectory setting unit 52, the estimated overall motion state trajectory determining unit 53, and the motion acceleration determining unit 54 correspond to the estimated movable link distal end portion trajectory setting element, the estimated overall momentum trajectory setting element, the estimated overall motion state trajectory determining element, and the motion acceleration determining element, respectively, in the present invention.

Further, the desired control position/attitude determining unit 55 and the joint displacement amount determining unit 56 constitute the desired joint control value determining element in the present invention.

A description will now be given of the entire processing by the motion target generating unit 42, including the details of the processing by each processing section of the motion target generating unit 42. In the present embodiment, the processing by the motion target generating unit 42 will be described by taking, as an example, the case where a motion target mainly for causing the robot 1 to travel by a walking motion or a running motion is generated.

The motion target generating unit 42 carries out the processing by each of the processing sections at a predetermined control processing cycle. To be specific, the motion target generating unit 42 first carries out the processing by the estimated movable link distal end portion trajectory setting unit 51 and the estimated overall momentum trajectory setting unit 52 at each control processing cycle.

In the present embodiment, desired landing position/attitude, which is the intended landing position and the intended landing attitude of the distal end portion (the foot portion 18) of a free leg for a plurality of steps after the current time, and the desired landing time, which is an intended landing time, are to be supplied to the estimated movable link distal end portion trajectory setting unit 51 and the estimated overall momentum trajectory setting unit 52 each time the leg link 3R or 3L, whichever is the free leg, lands or at each control processing cycle.

The desired landing position/attitude and the desired landing time are determined on the basis of, for example, a travel plan of the robot 1, a travel command issued by a control device, or the information on the environment around the robot 1. The determination processing is carried out by the control processing unit 41 or an external server of the robot 1. The desired time of the period for one step (gait cycle) of the robot 1 may be used in place of the desired landing time.

Then, the estimated movable link distal end portion trajectory setting unit 51 sets the estimated trajectory of the desired position/attitude ↑XL1_ref or ↑XL2_ref of the distal end portion (the foot portion 18) of each of the leg links 3L and 3R after the current time (the estimated trajectory in the period from the current time to predetermined time) on the basis of the desired landing position/attitude for a plurality of steps and the desired landing time that have been supplied.

The time interval (predetermined time) of the period of the estimated trajectories may be a time for a plurality of steps of the robot 1 or a time interval that is shorter than the time for one step (e.g. a time interval that is dozens of times one control processing cycle).

In the processing by the estimated movable link distal end portion trajectory setting unit 51, the estimated trajectory of the desired position/attitude ↑XL1_ref or ↑XL2_ref of the distal end portion (the foot portion 18) of the leg link 3, which is either the leg link 3L or 3R (the first movable link or the second movable link) to be driven as a free leg, is set such that the foot portion 18 moves into the air from the location of contact immediately before leaving a floor and lands according to the desired landing position/attitude and the desired landing time.

Figure 4:
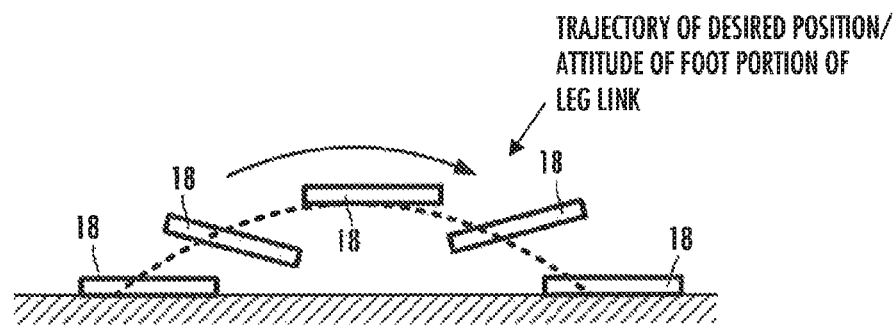
FIG. 4 is a diagram illustrating an example of an estimated trajectory of the motion state of the distal end portion of a leg link set by an estimated movable link distal end portion trajectory setting unit illustrated in FIG. 3.

For example, the estimated trajectory of the desired position/attitude ↑XL1_ref or ↑XL2_ref of the distal end portion is set such that the position and the attitude of the distal end portion (the foot portion 18) of the leg link 3 driven as the free leg will change as illustrated in FIG. 4.

In the example illustrated in FIG. 4, the attitude of the foot portion 18 of the leg link 3 is temporally changed. Alternatively, however, the attitude may remain constant throughout the whole period or a part of the period while the foot portion 18 is moving in the air.

The estimated trajectory of the desired position/attitude ↑XL1_ref or ↑XL2_ref of the foot portion 18 of the leg link 3, which is either the leg link 3L or 3R to be driven as a support leg, is set such that the foot portion 18 is maintained in contact with the ground without slipping. In this case, the desired attitude of the foot portion 18 can be set to remain constant throughout the whole period of the contact with the ground. Alternatively, the desired attitude of the foot portion 18 can be set such that the desired attitude temporally changes during the contact with the ground (i.e. the portion of the foot portion 18 in contact with the ground changes).

When the robot 1 is in the walking motion or the running motion, the leg link 3 driven as a free leg and the leg link 3 driven as the support leg are alternately switched when the robot 1 walks or runs.

Further, in the present embodiment, the estimated movable link distal end portion trajectory setting unit 51 sets the estimated trajectories of the desired position/attitude ↑XL3_ref and ↑XL4_ref of the distal end portion (the hand 30) of each of the arm links 4L and 4R (the third movable link and the fourth movable link) after the current time in the walking motion or the running motion of the robot 1 such that, for example, the position and the attitude of the hand 30 with respect to the upper base body 11 are maintained constant. Hence, the estimated trajectories of ↑XL3_ref and ↑XL4_ref are set according to the estimated trajectory of the basic desired position/attitude ↑Xb_ref_s of the base body 2, which is set by the estimated overall momentum trajectory setting unit 52 as will be discussed hereinafter.

Alternatively, however, the estimated trajectories of ↑XL3_ref and ↑XL4_ref may be set so as to relatively change the position or the attitude of the hand 30 of each of the arm links 4L and 4R with respect to the upper base body 11.

The processing by the estimated movable link distal end portion trajectory setting unit 51 is carried out as described above.

The estimated overall momentum trajectory setting unit 52 sets the estimated trajectory of the desired ZMP↑Zmp_ref after the current time according to the desired landing position/attitude and the desired landing time, which have been given (or according to the estimated trajectory of either the desired position/attitude ↑XL1_ref or ↑XL2_ref of the distal end portion of the leg link 3 that will be the leg link 3 to come in contact with the ground).

In this case, the estimated trajectory of ↑Zmp_ref is set such that ↑Zmp_ref is positioned within an area in a so-called support polygon, which area is not excessively close to the boundary thereof (an allowable area for the ZMP to lie), and does not develop discontinuous changes. As the technique for setting the trajectory of the desired ZMP, a publicly known technique may be used, including the technique described by the present applicant in, for example, Japanese Patent No. 3674789.

Then, the estimated overall momentum trajectory setting unit 52 uses the estimated trajectory of the desired position/attitude ↑XL1_ref or ↑XL2_ref of the distal end portion of the leg link 3 set by the estimated movable link distal end portion trajectory setting unit 51, the estimated trajectory of the desired ZMP ↑Zmp_ref, and the dynamics model established beforehand so as to indicate the dynamics of the robot 1 (the relationship between an external force (a floor reaction force in this case) acting on the robot 1 and the motion of the robot 1), thereby determining the estimated trajectory of the basic desired value of the motion acceleration of the base body 2 ↑Xbdot2_ref_s that makes it possible to attain the desired ZMP ↑Zmp_ref on the dynamics model (hereinafter referred to as "the basic desired motion acceleration ↑Xbdot2_ref_s).

The basic desired motion acceleration ↑Xbdot2_ref_s of the base body 2 is expressed as a seven-component vector composed of the basic desired value ↑Xbbdot2_ref_s (a six-component vector) of the motion acceleration ↑Xbbdot2 of the base body reference portion (the lower base body 10 or the upper base body 11), and the basic desired value θfdot2_ref_s of the displacement acceleration θfdot2 (the rotational angular velocity) of the base body joint 12.

The basic desired motion acceleration ↑Xbdot2_ref_s of the base body 2 that makes it possible to attain the desired ZMP ↑Zmp_ref means the motion acceleration of the base body 2 that causes the components about horizontal axes (the component about the X-axis and the component about the Y-axis) of the moment generated about the desired ZMP to be reduced to zero on the dynamics model by the resultant force of the inertial force generated by the overall motion of the robot 1 and the gravitational force acting on the robot 1.

The basic desired motion acceleration ↑Xbdot2_ref_s of the base body 2 is calculated without considering the joint motion constraint condition, such as the variable range of the displacement amount of each joint of the robot 1 (i.e. regarding that there is no joint motion constraint condition).

As the foregoing dynamics model, a dynamics model with high linearity can be used to permit relatively easy calculation of the basic desired position/attitude ↑Xb_ref_s of the base body 2 that makes it possible to attain the desired ZMP ↑Zmp_ref. For example, the same dynamics model as the dynamics model described by the present applicant in Japanese Patent No. 3674789 (the dynamics model illustrated in FIG. 10 of Japanese Patent No. 3674789) can be adopted as the dynamics model in the processing by the estimated overall momentum trajectory setting unit 52.

Figure 5:
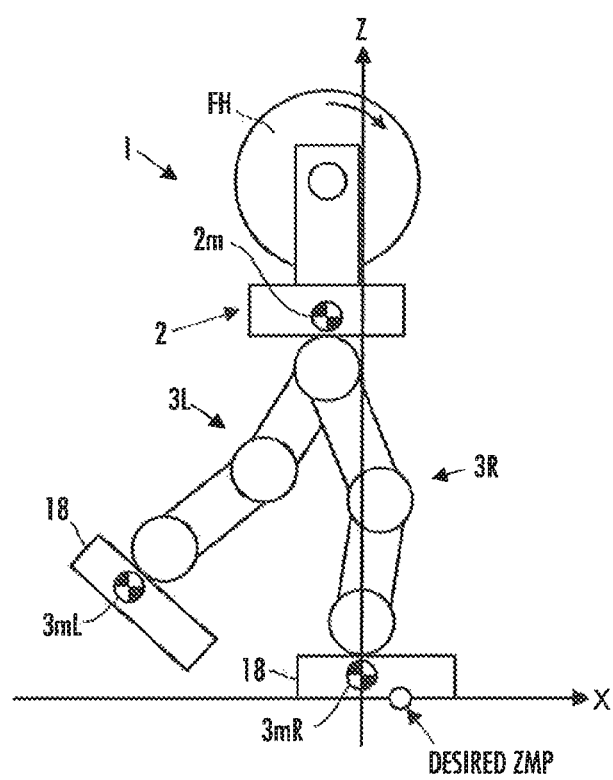
FIG. 5 is a diagram schematically illustrating a dynamics model used for the processing by an estimated overall momentum trajectory setting unit illustrated in FIG. 3.

As illustrated in FIG. 5, the dynamics model is a dynamics model provided with three mass points 3mL, 3mR and 2m, which correspond to the leg links 3L, 3R and the base body 2, respectively, and a flywheel FH that generates an inertial force moment accompanying a change in the attitude of the base body 2 (a flywheel that has inertia without having a mass).

More specifically, the inertial force moment generated by the flywheel FH is an inertial force moment about each of the three axes of the global coordinate system. The masses of the mass points 3mR, 3mL and 2m are set in advance such that the total sum of the masses agrees with the overall mass of the robot 1.

In the dynamics model, the motions of the distal end portions of the leg links 3L and 3R correspond to the motions of the mass points 3mL and 3mR, respectively, and the motion of the base body 2 including the base body joint 12 corresponds to the motion of the mass point 2m and the flywheel FH.

The use of the dynamics model described above makes it possible to set the estimated trajectory of the basic desired motion acceleration ↑Xbdot2_ref_s of the base body 2 after the current time according to the same technique as the technique for determining the desired upper body position/attitude described by the present applicant in Japanese Patent No. 3674789.

In other words, the estimated trajectory of the basic desired motion acceleration ↑Xbdot2_ref_s of the base body 2 (furthermore, the translational acceleration of the mass point 2m and the rotational angular acceleration of the flywheel FH) can be set such that a predetermined dynamic constraint condition is satisfied, the constraint condition being that the ZMP remains within a support polygon and a frictional force component of a floor reaction force acting on the robot 1 remains within a proper permissible range on the foregoing dynamics model.

The estimated overall momentum trajectory setting unit 52 carries out integration (second-order integration) on the value of ↑Xbdot2_ref_s in the estimated trajectory of the basic desired motion acceleration ↑Xbdot2_ref_s of the base body 2 set as described above thereby to set the estimated trajectory of the basic desired position/attitude ↑Xb_ref_s of the base body 2.

Further, the estimated overall momentum trajectory setting unit 52 sets the estimated trajectory of the desired overall momentum ↑PL_ref after the current time, by using the dynamics model, on the basis of the estimated trajectory of the desired motion acceleration ↑Xbdot2_ref_s (or the desired position/attitude ↑Xb_ref_s) of the base body 2 set as described above, the estimated trajectories of the desired positions/attitudes ↑XL1_ref and ↑XL2_ref of the distal end portions of the leg links 3L and 3R set by the estimated movable link distal end portion trajectory setting unit 51, and the estimated trajectory of the desired ZMP ↑Zmp_ref.

To be specific, the estimated overall momentum trajectory setting unit 52 calculates the estimated trajectory of the translational momentum of each of the mass points 3mL and 3mR on the basis of the estimated trajectory of the desired value ↑XL1dot_ref of the motion velocity ↑XL1dot of the distal end portion of each of the leg links 3L and 3R calculated from the estimated trajectories of the desired positions/attitudes ↑XL1_ref and ↑XL2_ref of the distal end portions of the leg links 3L and 3R.

Further, the estimated overall momentum trajectory setting unit 52 calculates the estimated trajectory of the translational momentum of the mass point 2m and the estimated trajectory of the angular momentum of the flywheel FH on the basis of the estimated trajectory of the motion velocity ↑Xbdot_ref_s of the base body 2 calculated from the estimated trajectory of the desired motion acceleration ↑Xbdot2_ref_s (or the desired position/attitude ↑Xb_ref_s) of the base body 2.

Then, the estimated overall momentum trajectory setting unit 52 calculates the estimated trajectory of the desired overall momentum ↑PL_ref from the estimated trajectory of the translational momentum of each of the mass points 3mL, 3mR and 2m, the estimated trajectory of the angular momentum of the flywheel FH, and the estimated trajectory of the desired ZMP ↑Zmp_ref.

In this case, the desired translational momentum ↑P_ref at each time (the time of each predetermined interval time ΔT) of the estimated trajectory of the desired overall momentum ↑PL_ref is calculated as the translational momentum of the total sum of the translational momenta of the mass points 3mL, 3mR and 2m (corresponding to the translational momentum of the overall center of gravity of the mass points 3mL, 3mR and 2m).

Further, the desired angular momentum ↑L_ref at each time of the estimated trajectory of the desired overall momentum ↑PL_ref is calculated as the angular momentum of the total sum of the angular momentum generated about the desired ZMP ↑Zmp_ref by the translational momentum of each of the mass points 3mL, 3mR and 2m, and the angular momentum of the flywheel FH.

Supplementarily, the dynamics model used for setting the estimated trajectory of ↑PL_ref may be a different type from the dynamics model provided with the three mass points 3mL, 3mR and 2m and the flywheel FH described above.

For example, a dynamics model provided with two additional mass points corresponding to the arm links 4L and 4R may be used, or a dynamics model provided with separate mass points for the lower base body 10 and the upper base body 11 may be used. Further, if, for example, the masses of the movable links 3 and 4 are sufficiently smaller than the mass of the base body 2, then a dynamics model that omits the mass points corresponding to the movable links 3 and 4 may be used.

As the dynamics model for setting the estimated trajectory of ↑PL_ref, a variety of dynamics models may be used insofar as the dynamics model is capable of generating the estimated trajectory of the desired overall momentum ↑PL that can be implemented in the robot 1. The dynamics model is preferably capable of generating the estimated trajectory of the desired overall momentum ↑PL by arithmetic processing of a relatively low load.

The processing by the estimated overall momentum trajectory setting unit 52 is carried out as described above.

In the following description, in order to discriminate an instantaneous value at each time (the time of each predetermined interval time ΔT) of the estimated trajectory of ↑PL_ref, a number k (k=1, 2, ..., N) indicative of time in a discrete-time system will be attached like, for example, ↑PL_ref(1), ↑PL_ref(2), ..., ↑PLref(N) in order from the current time. In this case, time denoted by k=1 will mean a current time (a current control processing cycle), and time denoted by k=N will mean the time after a predetermined time from the current time. The same will apply to other estimated trajectories, including the estimated trajectory of ↑XLi_ref.

The motion target generating unit 42 carries out the processing by the estimated overall motion state trajectory determining unit 53 after carrying out the processing by the estimated movable link distal end portion trajectory setting unit 51 and the estimated overall momentum trajectory setting unit 52 as described above.

The estimated overall motion state trajectory determining unit 53 in the present embodiment determines, according to the technique of resolved momentum control, the estimated overall motion state trajectory, which is the estimated trajectory of the desired values ↑Xb_ref and ↑θLi_ref (i=1 to 4) of the overall motion state of the robot 1 after the current time, such that the desired motion velocity ↑XLidot_ref (i=1 to 4) of the distal end portion of each of the movable links 3 and 4 calculated from the estimated trajectory of the desired position/attitude ↑XLi_ref (i=1 to 4) of the distal end portion of each of the movable links 3 and 4 and the desired overall momentum ↑PL_ref (=[↑P_ref$^T$, ↑L_ref$^T$]$^T$) of the robot 1 are implemented.

Briefly speaking, the foregoing technique of the resolved momentum control is a technique for determining the overall motion state of the robot 1 on the basis of the desired value of the overall momentum ↑PL of the robot 1 (↑PL_ref) and the desired value of the motion velocity ↑XLidot of the distal end portion of each of the movable links 3 and 4 (↑XLidot_ref) such that these desired values can be attained. According to the technique, however, the overall motion state of the robot 1 is determined without considerations given to the joint motion constraint condition of the robot 1 (regarding that there is no such joint motion constraint condition).

To be specific, according to technique of the resolved momentum control, the arithmetic processing based on expression (1) given below, which indicates the relationship among the overall momentum ↑PL of the robot 1, the motion velocity of the base body 2, and the displacement velocity of each joint of each of the movable links 3 and 4, and expression (2) given below, which indicates the relationship between the motion velocity of the base body 2 and the displacement velocity of each joint of each of the movable links 3 and 4 is first carried out so as to calculate the desired motion velocity ↑Xbdot_ref of the base body 2 for attaining ↑XLidot_ref (i=1 to 4) and ↑PL_ref at each time (the time at each predetermined interval time ΔT) of the estimated overall motion state trajectory.

$$\begin{bmatrix} \uparrow P \\ \uparrow Lc \end{bmatrix} = A1 \cdot \uparrow Xbdot + \sum_{i=1}^{NL} \left( \begin{bmatrix} MLi \\ HLi \end{bmatrix} \cdot \uparrow \theta Lidot \right) \quad (1)$$

$$\uparrow XLidot = Jb \cdot \uparrow Xbdot + JLi \cdot \uparrow \theta Lidot \quad (2)$$

In expression (1), ↑P denotes the overall translational momentum (a three-component vector) of the robot 1, ↑Lc denotes the overall angular momentum (a three-component vector) about the overall center of gravity of the robot 1, ↑Xbdot denotes the motion velocity of the base body 2 (a seven-component vector constituted of each component of the motion velocity ↑Xbbdot of the base body reference portion and the displacement velocity θfdot of the base body joint 12), A1 denotes a Jacobian matrix (a 6×7 matrix) for converting the motion velocity of the base body 2 ↑Xbdot into a set of the translational momentum and the angular momentum (the angular momentum about the overall center of gravity), which are generated according to the motion velocity ↑Xbdot, NL denotes the quantity (=4) of the movable links 3 and 4, ↑θLidot denotes a vector made up of the components of the displacement velocity of each joint of the i-th movable link as the component thereof (a six-component vector), MLi denotes a Jacobian matrix (a 3×6 matrix) for converting ↑θLidot (hereinafter referred to as "the joint displacement velocity ↑θLidot of the i-th movable link) into a translational momentum generated according to ↑θLidot, and HLi denotes a Jacobian matrix (a 3×6 matrix) for converting the joint displacement velocity ↑θLidot of the i-th movable link into an angular momentum (an angular momentum about the overall center of gravity of the robot 1) generated according to the joint displacement velocity ↑θLidot.

In this case, the Jacobian matrix A1 is a matrix in a form indicated by expression (1a) given below.

$$A1 = \begin{bmatrix} m \cdot E_3 & m \cdot Dbc & Mf \\ O_3 & I & Hf \end{bmatrix} \quad (1a)$$

In expression (1a), "m" denotes the overall mass of the robot 1, $E_3$ denotes a 3×3 unit matrix, $O_3$ denotes a 3×3 zero matrix, I denotes an inertial matrix (3×3 matrix) related to the rotational motion about the overall center of gravity of the robot 1, Mf denotes a matrix (a 3×1 matrix) for converting the displacement velocity of the base body joint 12 into a translational momentum generated according to the displacement velocity of the base body joint 12, and Hf denotes a matrix (a 3×1 matrix) for converting the displacement velocity of the base body joint 12 into an angular momentum (an angular momentum about the overall center of gravity of the robot 1) generated according to the displacement velocity of the base body joint 12.

Further, Dbc in expression (1a) denotes a matrix (a 3×3 matrix) defined such that a relationship denoted by Dbc·↑ωbb=−rbb_cx↑ωbb with respect to a cross product (=rbb_cx↑ωbb) of a positional vector ↑rbb_c (a three-component vector) of the overall center of gravity of the robot 1 relative to the position of the base body reference portion and a motion velocity (angular velocity) ↑ωbb (a three-component vector) related to the attitude of the base body reference portion is established.

Further, in expression (2) given above, ↑XLidot denotes a motion velocity (a six-component vector) of the distal end portion of the i-th movable link, Jb denotes a Jacobian matrix (a 6×7 matrix) for converting the motion velocity ↑Xbdot of the base body 2 into the motion velocity IXLidot of the distal end portion of the i-th movable link, and JLi denotes a Jacobian matrix (a 6×6 matrix) for converting the joint displacement velocity ↑θLidot of the i-th movable link into the motion velocity ↑XLidot of the distal end portion of the i-th movable link.

Expression (3) given below is derived from expressions (1) and (2) given above.

$$\uparrow Xbdot = A^{\#} \cdot \left( \begin{bmatrix} \uparrow P \\ \uparrow Lc \end{bmatrix} - \sum_{i=1}^{NL} \left( \begin{bmatrix} MLi \\ HLi \end{bmatrix} \cdot JLi^{\#} \cdot \uparrow XLidot \right) \right) + \qquad (3)$$

$$(E_7 - A^{\#} \cdot A) \cdot \uparrow Xbdot\_a$$

where $$A \equiv A1 - \sum_{i=1}^{NL} \left( \begin{bmatrix} MLi \\ HLi \end{bmatrix} \cdot JLi^{\#} \cdot Jb \right) \qquad (3a)$$

In expression (3) given above, A denotes a matrix (a 6×7 matrix) defined by expression (3a) given in the where clause above from the Jacobian matrices A1, MLi (i=1 to 4), HLi (i=1 to 4) and Jb, and a pseudo inverse matrix JLi$^{\#}$ of the Jacobian matrix JLi (i=1 to 4), A$^{\#}$ denotes a pseudo inverse matrix (a 7×6 matrix) of the matrix A, and E$_7$ denotes a 7×7 unit matrix. Further, ↑Xbdot_a denotes an adjustment motion velocity (a 7-component vector) of the base body 2, which utilizes a redundant degree of freedom.

In the present embodiment, the estimated trajectory of the desired motion velocity ↑Xbdot_ref of the base body 2 for implementing the estimated trajectories of ↑XLidot_ref (i=1 to 4) and ↑PL_ref is determined according to expression (3) given above.

To be specific, the desired motion velocity ↑Xbdotref(k) of the base body 2 at each time k (k=1 to N) of the estimated overall motion state trajectory is sequentially calculated by computing the right side of expression (3) given above.

In this case, the parameters for computing the right side of expression (3) are determined as described below.

The matrix A used to calculate ↑Xbdot_ref(k) at time k is calculated according to expression (3a) in the where clause of expression (3) from the Jacobian matrices A1, MLi (i=1 to 4) and HLi (i=1 to 4) described in relation to expressions (1) and (2), and the Jacobian matrices Jb and JLi (i=1 to 4) defined by the where clause of expression (2).

In this case, the Jacobian matrices A1, MLi (i=1 to 4), HLi (i=1 to 4), Jb and JLi are calculated as the Jacobian matrices in a state in which the overall motion state of the robot 1 agrees with the desired values ↑Xb_ref and ↑θLi_ref (i=1 to 4) of the overall motion state of the robot 1 at time k−1 of the estimated overall motion state trajectory. However, in the case where ↑Xbdot_ref(k) at time k=1 is calculated, the Jacobian matrix is calculated on the assumption that the overall motion state of the robot 1 agrees with the desired values ↑Xb_cmd and ↑θLi_cmd (i=1 to 4) of the overall motion state of the robot 1 that has been ultimately determined at a previous control processing cycle.

To calculate the Jacobian matrices A1, MLi (i=1 to 4) and HLi (i=1 to 4), a dynamics model that has mass and inertia imparted to each link element of the robot 1 is used.

Further, from JLi among the Jacobian matrices calculated as described above, the pseudo inverse matrix JLi$^{\#}$ thereof is calculated. In this case, the quantity of the joints of each of the movable links 3 and 4 (the number of components of ↑θLidot) in the present embodiment is six, so that JLi$^{\#}$ is calculated as the inverse matrix JLi$^{-1}$ of JLi.

Supplementarily, it is possible to set the quantity of the joints of the movable link 3 or 4 of the robot 1 to seven or more (in other words, the number of degrees of freedom of the movable link 3 or 4 can be set to seven or more). The pseudo inverse matrix JLi$^{\#}$ for a movable link having seven or more joints can be calculated according to the same arithmetic expression as that used for calculating A$^{\#}$, which will be discussed hereinafter.

Further, the pseudo inverse matrix A$^{\#}$ used for calculating ↑Xbdot_ref(k) at time k is calculated from the matrix A calculated as described above.

In this case, A$^{\#}$ is calculated according to, for example, expression (4) given below.

$$A^{\#} = W^{-1} \cdot A^T \cdot (A \cdot W^{-1} \cdot A^T)^{-1} \qquad (4)$$

In this expression (4), W denotes a preset weight coefficient matrix (diagonal matrix). The weight coefficient matrix is preset on the basis of experiments or the like by considering the control characteristics and the like of the robot 1.

The desired translational momentum ↑P_ref at time k in the estimated overall momentum trajectory is determined as the value of ↑P used to calculate ↑Xbdot_ref(k). Further, the value of ↑Lc used to calculate ↑Xbdot_ref(k) is calculated as the value obtained by converting the desired angular momentum ↑L_ref (the angular momentum about the desired ZMP ↑Zmp_ref(k) at time k in the estimated overall momentum trajectory into an angular momentum about the overall center of gravity of the robot 1 at time k.

In this case, the position of the overall center of gravity of the robot 1 is to agree with the position of the overall center of gravity at k in the dynamics model used in the processing by the estimated overall momentum trajectory setting unit 52.

Supplementarily, the angular momentum ↑L about the desired ZMP ↑Zmp_ref can be adopted in place of ↑Lc of expression (3) given above. In such a case, the Jacobian matrix A1 in expression (1) given above will be a matrix that is different from the one indicated in the where clause of expression (1). Further, in this case, the desired angular momentum ↑L_ref at time k in the estimated overall momentum trajectory can be directly used as the value of ↑L used to calculate ↑Xbdot_ref(k).

Further, the desired motion velocity ↑XLidot_ref of the distal end portion of the i-th movable link at time k defined by the estimated movable link distal end portion trajectory is determined as the value of ↑XLidot (i=1 to 4) of the i-th movable link used to calculate ↑Xbdotref(k).

Further, the value of the adjustment motion velocity ↑Xbdot_a of the base body 2 used to calculate ↑Xbdot_ref (k) is determined, for example, as described below in the present embodiment.

More specifically, a difference Δ↑Xb between the desired position/attitude ↑Xb_ref of the base body 2 at time k−1 and the basic desired position/attitude ↑Xb_ref_s, and a temporal change rate d∆↑Xb thereof (i.e. the difference between the temporal change rate of ↑Xb_ref and the temporal change rate of ↑Xb_ref_s) is calculated from the estimated overall motion state trajectory until time k−1, which has already been calculated, and the estimated trajectory of the basic desired position/attitude ↑Xb_ref_s of the base body 2 until time k−1, which has been calculated by the estimated overall momentum trajectory setting unit 52. Then, the value of the adjustment motion velocity ↑Xbdot_a of the base body 2 used to calculate ↑Xbdot_ref(k) is calculated according to expression (5) given below on the basis of the difference ∆↑Xb and the temporal change rate d∆↑Xb thereof.

$$↑Xbdot\_a = Kp·∆↑Xb + Kv·d∆↑Xb \quad (5)$$

Kp and Kv denote gains of predetermined values. When calculating ↑Xbdot_ref(k) at time k=1, ↑Xbdot_a is set to a zero vector.

The values of the parameters (A, A#, ↑P, ↑Lc, MLi (i=1 to 4), HLi (i=1 to 4), JLi#, ↑XLidot and ↑Xbdot_a) used to calculate ↑Xbdot_ref(k) at each time k (k=1, 2, ..., N) of the estimated overall motion state trajectory are determined as described above. Then, the computation of the right side of expression (3) given above is carried out, using the values of the parameters, thereby to calculate ↑Xbdot_ref(k).

Thus, the estimated trajectory of the desired motion velocity ↑Xbdot_ref of the base body 2 is determined by the technique of resolved momentum control such that the estimated trajectory of ↑PL_ref and the estimated trajectory of ↑XLi_ref (i=1 to 4) can be implemented.

After calculating the estimated trajectory of the ↑Xbdot_ref as described above, the estimated overall motion state trajectory determining unit 53 integrates the ↑Xbdot_ref to calculate the desired position/attitude ↑Xb_ref(k) of the base body 2 at each time k of the estimated overall motion state trajectory. Thus, the estimated trajectory of the desired position/attitude ↑Xb_ref of the base body 2 in the estimated overall motion state trajectory is determined.

In this case, the initial value of ↑Xb_ref in the integration computation of ↑Xbdot_ref is to agree with the desired position/attitude ↑Xb_cmd of the base body 2 of the robot 1 ultimately determined at the previous control processing cycle.

Further, the estimated overall motion state trajectory determining unit 53 calculates the desired joint displacement amount ↑θLi_ref (i=1 to 4) of each of the movable links 3 and 4 at each time k of the estimated overall motion state trajectory by the inverse kinematics computation on the basis of the estimated trajectory of ↑Xb_ref and the estimated trajectory of the desired position/attitude ↑XLi_ref of the distal end portion of each of the movable links 3 and 4. Thus, the estimated trajectory of the desired joint displacement amount ↑θLi_ref (i=1 to 4) of each of the movable links 3 and 4 in the estimated overall motion state trajectory is determined.

The processing by the estimated overall motion state trajectory determining unit 53 is carried out as described above. The estimated overall motion state trajectory determined by the processing is determined, without considering the joint motion constraint condition of each joint of the robot 1, such that the estimated trajectory of the desired overall momentum ↑PL_ref of the robot 1 and the estimated trajectory of the desired position/attitude ↑XLi_ref of the distal end portion of each of the movable links 3 and 4 (the first to the fourth movable links) are implemented.

Hence, there are cases where the estimated overall motion state trajectory does not satisfy the joint motion constraint condition, such as the variable range of the displacement amounts of the joints of the movable link 3 or 4 of the robot 1.

After determining the estimated overall motion state trajectory as described above, the motion target generating unit 42 carries out the processing by the motion acceleration determining unit 54.

The motion acceleration determining unit 54 calculates the post-current-time time series of ↑u_sol(k) (k=1 to N) of the motion acceleration Tu composed as a set of the motion acceleration ↑Xbdot2 of the base body 2 of the robot 1 and the motion acceleration ↑XLidot2 (i=1 to 4) of the distal end portion of each of the movable links 3 and 4 by the arithmetic processing of the solution technique of the secondary plan problem such that a predetermined evaluation function related to a predetermined type of state amount of the robot 1 at a plurality of times k (k=1 to N) after the current time can be minimized under the joint motion constraint condition of the robot 1. Hereinafter, the motion acceleration ↑u_sol(k) to be calculated will be referred to as "the motion acceleration under constraint condition ↑u_sol(k)."

In this case, the predetermined types of state amounts in the present embodiment are two types of state amounts, namely, the motion acceleration ↑Xbdot2 of the base body 2 of the robot 1 and the motion acceleration ↑XLidot2 (i=1 to 4) of the distal end portion of each of the movable links 3 and 4, and the overall momentum ↑PL of the robot 1.

Then, the motion acceleration determining unit 54 determines the motion acceleration under constraint condition ↑u_sol(1) at the current time (the time at k=1), which is the initial time, among the motion accelerations under constraint condition ↑u_sol(k), as the desired motion acceleration ↑u_cmd for the actual control of the robot 1 to be determined at the current control processing cycle.

More specifically, the motion accelerations under constraint condition ↑u_sol(1) to ↑u_sol(N) after the current time, which are calculated at each control processing cycle, denote the time series of the motion acceleration Tu (the time series of the value of Tu at each predetermined interval time ∆T after the current time) that maximizes the degree of agreement between the trajectory of the motion acceleration under constraint condition ↑u_sol and the trajectory of the desired motion acceleration ↑u_ref defined by the estimated overall motion state trajectory and the degree of agreement between the trajectory of the overall momentum ↑PL_sol of the robot 1 generated according to the trajectory of the motion acceleration under constraint condition ↑u_sol and the estimated overall momentum trajectory (the estimated trajectory of ↑PL_ref) within a range in which the joint motion constraint condition of the robot 1 is satisfied.

The joint motion constraint condition of the robot 1 in the present embodiment is the constraint conditions of the variable ranges of the displacement amount and the displacement velocity of each joint (the constraint condition that the displacement amount of each joint remains in a predetermined variable range and a constraint condition that the displacement velocity of each joint remains within a predetermined variable range).

The predetermined evaluation function for calculating the motion acceleration under constraint condition ↑u_sol(1) to ↑u_sol(N) in the present embodiment is an evaluation function Ef represented by expression (6) given below.

$$Ef = \sum_{k=1}^{N} ef(k) \qquad (6)$$

$$= \sum_{k=1}^{N} (\uparrow DPL(k)^T \cdot QPL \cdot \uparrow DPL(k) + \uparrow Du(k)^T \cdot Ru \cdot \uparrow Du(k))$$

where $$\uparrow DPL(k) \equiv \uparrow PL\_sol(k) - \uparrow PL\_ref(k) \qquad (6a)$$

$$\uparrow Du(k) \equiv \uparrow u\_sol(k) - \uparrow u\_ref(k) \qquad (6b)$$

$$\uparrow PLsol(k) = B(k) \cdot \uparrow v\_sol(k) \qquad (6c)$$

In expressions (6) and (6a) to (6c) given above, ↑PL_sol(k) denotes the estimated value (the value at time k) of the overall momentum generated by a motion of the robot 1 defined by the motion acceleration under constraint condition ↑u_sol(1) to ↑u_sol(N).

The ↑PL_sol(k) denotes the overall momentum calculated according to expression (6c) on the basis of a motion velocity ↑v_sol(k) at time k calculated by the integration of the motion acceleration under constraint condition ↑u_sol (specifically a vector in which the motion velocities ↑Xbdot_sol and ↑XLidot_sol (i=1 to 4) at time k calculated by integrating each of the components ↑Xbdot2_sol and ↑XLidot2_sol (i=1 to 4) of ↑u_sol are arranged).

Further, B(k) in the expression (6c) denotes a Jacobian matrix for converting the motion velocity ↑v (a vector constituted using, as the components thereof, the motion velocities of the base body 2 and the distal end portion of each of the movable links) into the overall momentum ↑PL in the motion state of the robot 1 at time k. In this case, the Jacobian matrix B(k) used for the computation of expression (6c) is determined on the basis of a motion state of the robot 1 at time k, regarding that the motion state agrees with the motion state of the robot 1 at time k in the estimated overall motion state trajectory.

Further, ↑PL_ref(k) denotes the desired overall momentum at time k in the estimated overall momentum trajectory, ↑u_ref denotes the desired motion acceleration at time k defined by the estimated overall motion state trajectory (a vector using, as the components thereof, the desired values of the motion accelerations of the base body 2 and the distal end portion of each of the movable links), and QPL and Ru denote the weight coefficient matrices (diagonal matrices) for adjusting the operation characteristics of the robot 1.

In the expression (6), ef(k) (k=1 to N) denotes a value obtained by adding a value which is obtained by linearly combining the square value of each component of a momentum difference IDPL(k) defined by expression (6a) of the where clause of expression (6) and a value which is obtained by linearly combining the square value of each component of a motion acceleration difference ↑Du(k) defined by expression (6b) in the where clause.

The weight coefficient matrices QPL and Ru are set beforehand on the basis of experiments or the like such that the predetermined operation characteristics of the robot 1 can be implemented. Alternatively, however, a unit matrix may be adopted for QPL or Ru.

The value of the evaluation function Ef corresponds to the index value that combines a momentum evaluation index value which indicates the degree of agreement between the trajectory of ↑PL_sol and the trajectory of ↑PL_ref, and the motion acceleration evaluation index value which indicates the degree of agreement between the trajectory of ↑u_sol and the trajectory of ↑u_ref. Therefore, a smaller value of Ef (a value closer to zero) means a higher degree of agreement between the trajectory of ↑u_sol and the trajectory of ↑u_ref and a higher degree of agreement between the trajectory of ↑PL_sol and the trajectory of ↑PL_ref.

Further, the joint motion constraint condition related to the displacement amount and the displacement velocity of each joint of the robot 1 in the present embodiment uses the inequalities of expressions (7) to (10) given below.

$$\uparrow \theta Lidot\_min \leq \uparrow \theta Lidot\_sol(k) \leq \uparrow \theta Lidot\_max(i=1 \text{ to } 4) \qquad (7)$$

$$\uparrow \theta Li\_min \leq \uparrow \theta Li\_sol(k) \leq \uparrow \theta Li\_max(i=1 \text{ to } 4) \qquad (8)$$

$$\theta fdot\_min \leq \theta fdot\_sol(k) \leq \theta fdot\_max \qquad (9)$$

$$\theta f\_min \leq \theta f\_sol(k) \leq \theta f\_max \qquad (10)$$

In these expressions (7) to (10), ↑θLidot_min (i=1 to 4) denotes a vector (six-component vector) in which the lower limit values in the variable ranges of the displacement velocities of the joints of the i-th movable link are arranged, ↑θLidot_max (i=1 to 4) denotes a vector (six-component vector) in which the upper limit values in the variable ranges of the displacement velocities of the joints of the i-th movable link are arranged, ↑θLi_min (i=1 to 4) denotes a vector (six-component vector) in which the lower limit values in the variable ranges of the displacement amounts of the joints of the i-th movable link are arranged, ↑θLi_max (i=1 to 4) denotes a vector (six-component vector) in which the upper limit values in the variable ranges of the displacement amounts of the joint of the i-th movable link are arranged, θfdot_min denotes the lower limit value of the variable range of the displacement velocity of the base body joint 12, θfdot_max denotes the upper limit value of the variable range of the displacement velocity of the base body joint 12, θf_min denotes the lower limit value of the variable range of the displacement amount of the base body joint 12, and θf_max denotes the upper limit value of the variable range of the displacement amount of the base body joint 12.

Further, ↑θLidot_sol(k) (i=1 to 4) denotes a vector in which the displacement velocities of the joints of the i-th movable link at time k in the motion state of the robot 1 defined by ↑u_sol(1) to ↑u_sol(N) are arranged. The ↑θLidot_sol(k) denotes a vector calculated according to expression (7a) given below.

$$\uparrow \theta Lidot\_sol(k) = JLi(k)^{\#} \cdot (\uparrow XLidot\_sol(k) - Jbi(k) \cdot \uparrow Xbdot\_sol(k)) \qquad (7a)$$

In this expression (7a), JLi(k)$^{\#}$ (i=1 to 4) denotes a pseudo inverse matrix of the Jacobian matrix JLi(k) for converting a vector ↑θLidot, in which the displacement velocity of each joint of the i-th movable link is arranged, into the motion velocity ↑XLidot of the distal end portion of the i-th movable link in the motion state of the robot 1 at time k in the estimated overall motion state trajectory, ↑XLidot_sol(k) (i=1 to 4) denotes the motion velocity of the distal end portion of the i-th movable link at time k, which is calculated by integrating ↑XLidot2_sol among the motion acceleration under constraint condition ↑u_sol, ↑Xbdot_sol(k) denotes the motion velocity of the base body 2 at time k, which is calculated by integrating ↑Xbdot2_sol among the motion acceleration under constraint condition ↑u_sol, and Jbi(k) (i=1 to 4) denotes a Jacobian matrix for converting the motion velocity ↑Xbdot of the base body 2 into the motion velocity ↑XLidot of the distal end portion of the i-th movable link in the motion state of the robot 1 at time k in the estimated overall motion state trajectory.

Further, θLi_sol(k) denotes a vector in which the displacement amounts of the joints of the i-th movable link at time k, which is calculated by integrating ↑θLidot_sol, are arranged, θfdot_sol(k) denotes the displacement velocity of the base body joint 12 at time k, which is calculated by integrating ↑θfdot2_sol (the displacement acceleration of the base body joint 12) among the motion acceleration under constraint condition ↑u_sol, and ↑θf_sol(k) denotes the displacement amount of the base body joint 12, which is calculated by integrating θfdot_sol.

The time series ↑u_sol(1) to ↑u_sol(N) of the motion acceleration under constraint condition ↑u that minimizes the value of the evaluation function Ef indicated by expression (6) under the joint motion constraint condition indicated by the inequalities (linear inequalities) of expressions (7) to (10) is calculated as described below.

The motion acceleration determining unit 54 first calculates the Jacobian matrix B(k) (k=1 to N) necessary for calculating ↑DPL(k) of the right side of expression (6) and Jacobian matrices JLi(k) and Jbi(k) (i=1 to 4; k=1 to N) necessary for calculating θLidot_sol(k) of expression (7).

In this case, the Jacobian matrices B(k), JLi(k) and Jbi(k) are calculated as the Jacobian matrices in a state in which the overall motion state of the robot 1 at time k agrees with the desired values ↑Xb_ref(k) and ↑θLi_ref(k) (i=1 to 4) of the overall motion state at time k in the estimated overall motion state trajectory. In the processing of calculating the Jacobian matrix B(k), a dynamics model that has mass and inertia imparted to each link element of the robot 1 is used.

Further, the motion acceleration determining unit 54 calculates the pseudo inverse matrix JLi(k)$^{\#}$ of the Jacobian matrix JLi(k). In this case, the quantity of the joints of each of the movable links 3 and 4 (the quantity of the components of ↑θLidot) in the present embodiment is six. Hence, JLi(k)$^{\#}$ is calculated as the inverse matrix JLi(k)$^{-1}$ of JLi(k).

Then, the motion acceleration determining unit 54 calculates the time series ↑u_sol(1) to ↑u_sol(N) of the motion acceleration under constraint condition Tu that minimizes the value of the evaluation function Ef indicated by expression (6) under the constraint condition indicated by the inequalities of expressions (7) to (10) by carrying out the arithmetic processing of a publicly known solution technique of the secondary plan problem, by using the Jacobian matrices B(k), Jbi(k) (i=1 to 4), and the pseudo inverse matrix JLi(k)$^{\#}$ (i=1 to 4; k=1 to N).

In this case, as the solution technique of the secondary plan problem, for example, the interior-point-convex method or the trust-region-reflective method may be used.

The motion acceleration determining unit 54 calculates the time series ↑u_sol(1) to ↑u_sol(N) of the motion acceleration under constraint condition ↑u as described above.

Thus, the time series ↑u_sol(1) to ↑u_sol(N) of the motion acceleration under constraint condition ↑u_sol is calculated by the arithmetic processing of the solution technique of the secondary plan problem such that the degree of agreement between the trajectory of the motion acceleration under constraint condition ↑u_sol and the trajectory of the desired motion acceleration ↑u_ref defined by the estimated overall motion state trajectory and the degree of agreement between the trajectory of the overall momentum ↑PL_sol of the robot 1 generated according to the trajectory of the motion acceleration under constraint condition ↑u_sol and the estimated overall momentum trajectory (the estimated trajectory of ↑PL_ref) are maximized within a range in which the constraint condition related to the motion of each joint of the robot 1 is satisfied.

In this case, the value of ↑PL_sol(k) at each time k of the trajectory of the overall momentum ↑PL_sol of the robot 1 generated according to the trajectory of the motion acceleration under constraint condition ↑u_sol is calculated using the Jacobian matrix defined on the basis of the estimated overall motion state trajectory determined without considering the constraint condition related to the motion of each joint. Hence, the arithmetic processing of the secondary plan problem can be carried out in a shorter time.

Then, the motion acceleration determining unit 54 determines, as the desired motion acceleration ↑u_cmd to be determined at the current control processing cycle, the motion acceleration under constraint condition ↑u_sol(1) at the current time (the time of k=1) in the time series ↑u_sol (1) to ↑u_sol(N) of the motion acceleration under constraint condition ↑u_sol.

Thus, the desired motion acceleration ↑u_cmd is determined at each control processing cycle.

The processing by the motion acceleration determining unit 54 is carried out as described above.

The motion target generating unit 42 then sequentially carries out the processing by the desired control position/attitude determining unit 55 and the joint displacement amount determining unit 56.

The desired control position/attitude determining unit 55 carries out the integral computation (second-order integration) on each component of the desired motion acceleration ↑u_cmd, which has been determined at each control processing cycle by the motion acceleration determining unit 54, at each control processing cycle. Thus, the desired control value ↑Xb_cmd of the position and the attitude of the base body 2 of the robot 1 and the desired control value ↑XLi_cmd (i=1 to 4) of the position and the attitude of the distal end portion of each of the movable links 3 and 4 at each control processing cycle are determined.

Subsequently, the joint displacement amount determining unit 56 determines the desired displacement amount of each joint of the robot 1 by the inverse kinematics computation from the desired control values ↑Xb_cmd and ↑XLi_cmd (i=1 to 4) determined by the desired control position/attitude determining unit 55 at each control processing cycle.

The processing by the motion target generating unit 42 described above determines the desired displacement amount of each joint of the robot 1 at each control processing cycle.

According to the present embodiment, at each control processing cycle, the time series of the motion acceleration under constraint condition ↑u_sol(k) at a plurality of times k (k=1 to N) after the current time is calculated by the arithmetic processing of the solution technique of the secondary plan problem such that the value of the evaluation function Ef related to the overall momentum ↑PL and the motion acceleration ↑u of the robot 1 is minimized within a range in which the joint motion constraint condition related to the variable ranges of the displacement amount and the displacement velocity of each joint of the robot 1 is satisfied.

In this case, the Jacobian matrix for calculating the overall momentum ↑PL_sol in the evaluation function Ef is the Jacobian matrix defined by the estimated overall motion state trajectory. Hence, the arithmetic processing of the solution technique of the secondary plan problem can be efficiently carried out in a shorter time.

Then, the motion acceleration under constraint condition ↑u_sol(1) at the current time as the initial time in the time series of the motion acceleration under constraint condition ↑u_sol(k) calculated by the arithmetic processing of the solution technique of the secondary plan problem is determined as the desired motion acceleration ↑u_cmd to be determined at the current control processing cycle.

The desired displacement amount of each joint at each control processing cycle is determined such that the desired motion acceleration ↑u_cmd determined at each control processing cycle can be attained.

Therefore, the motion target (the desired displacement amount of each joint) of the robot 1 can be determined such that the occurrence of a situation in which the joint motion constraint condition is no longer satisfied is obviated in a situation in which the joint motion constraint condition may be no longer satisfied in the near future.

This arrangement makes it possible to determine a motion target that enables the robot 1 to smoothly perform a continuous motion within the range in which the joint motion constraint condition can be satisfied.

Further, according to the present embodiment, the angular momentum ↑L_sol of the overall momentum ↑PL_sol in the evaluation function Ef is the angular momentum about the desired ZMP ↑Zmp_ref. This makes it possible to generate a motion target that allows a dynamically proper motion of the robot 1 to be achieved.

Figure 6A:
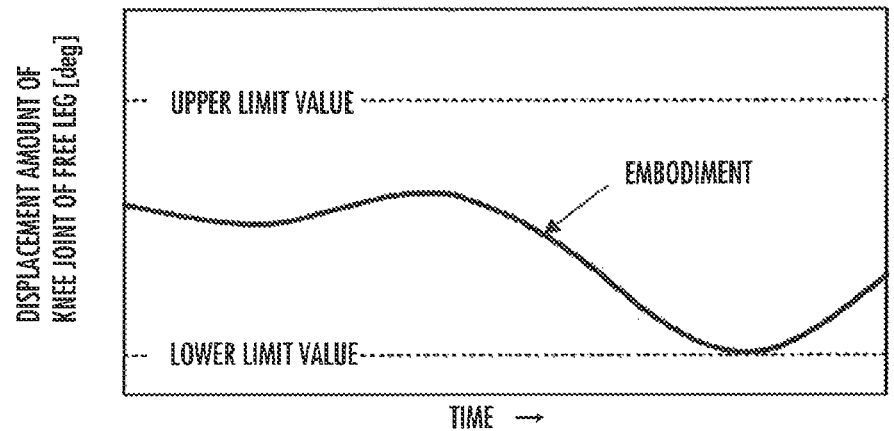
FIG. 6A and FIG. 6B are graphs illustrating the time-dependent change of the displacement amount of a joint of a movable link (leg link) in the embodiment and a comparative example, respectively.
Figure 6B:
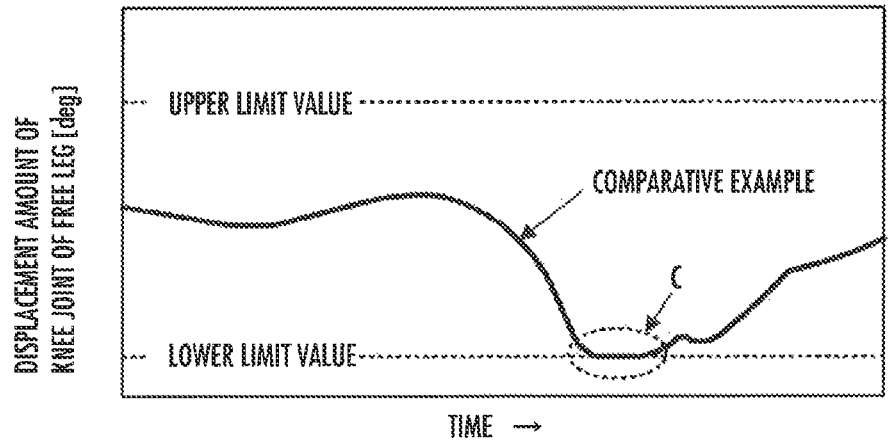

The verification of the advantages of the embodiment described above will now be described with reference to FIG. 6. FIG. 6A is a graph illustrating the embodiment and FIG. 6B is a graph illustrating a comparative example. The graph of the embodiment illustrates the time-dependent change of the desired displacement amount of the joint 22 of the knee joint portion 15 of the leg link 3 that is to be driven as a free leg when the processing of generating the motion target of the robot 1 is carried out with the length of stride for one step of the robot 1 set to a large value (e.g. 750 mm) in the foregoing embodiment.

Further, the graph of the comparative example illustrates the time-dependent change of the desired displacement amount of the joint 22 of the knee joint portion 15 of the leg link 3 that is to be driven as a free leg when the processing of generating the motion target of the robot 1 is carried out, using the foregoing length of stride, without generating the estimated overall motion state trajectory for the future after the current time. Specifically, the processing of generating the motion target in the comparative example is the processing of generating the motion target by setting the value of N in the foregoing expression (6) to "1."

As illustrated in FIG. 6B, according to the comparative example, the desired displacement amount of the joint 22 is undesirably maintained at the lower limit value of the variable range of the displacement amount of the joint 22 in an area C in the graph.

In contrast thereto, according to the embodiment, the desired displacement amount of the joint 22 smoothly changes without causing the situation in which the desired displacement amount is held at the lower limit value, as illustrated in FIG. 6A. This is considered to be because the foregoing motion acceleration under constraint condition ↑u_sol at each control processing cycle is determined and consequently the displacement amount of each joint of the robot 1 is determined such that the occurrence of the situation, in which the desired displacement amount of the joint 22 becomes likely to deviate from the variable range in the near future, is obviated.

The robot 1 in the embodiment described above is a humanoid mobile robot that has the arm links 4R, 4L and the head 5. Alternatively, however, the robot 1 may be a mobile robot not provided with the arm links 4R, 4L or the head 5.

Further alternatively, the base body joint 12 may be omitted, and the lower base body 10 and the upper base body 11 may be combined into one body.

Further, the robot 1 may have three or more leg links. The quantity of the arm links may be one, or three or more. The base body joint 12 may have two or more degrees of motional freedom. Further, the robot 1 may include direct acting type joints rather than limiting to the rotary type joints.

Further, each of the movable links 3 and 4 of the robot 1 may have seven or more joints.

Further, in the foregoing embodiment, the joint motion constraint condition includes the constraint condition of the variable range of the displacement amount of each joint and the constraint condition of the variable range of the displacement velocity of each joint. Alternatively, however, only one of the constraint conditions may be used. Further alternatively, the constraint condition of the variable range of the displacement acceleration of each joint may be used as the joint motion constraint condition.

What is claimed is:

1. A motion target generating apparatus of a mobile robot adapted to sequentially generate, at a predetermined control processing cycle, a desired control value for controlling a motion of each joint of a mobile robot, which has a plurality of movable links, including a leg link extended from a base body, and in which a distal end portion of each of the movable links is configured to move relative to the base body by a motion of a joint provided in the movable link between the distal end portion and the base body, the motion target generating apparatus comprising:

estimated movable link distal end portion trajectory setting element that sets an estimated movable link distal end portion trajectory, which is an estimated trajectory of a desired value of a motion state of the distal end portion of each of the movable links after a current time, at each control processing cycle;

estimated overall momentum trajectory setting element that sets an estimated overall momentum trajectory, which is an estimated trajectory of a desired value of an overall momentum of the mobile robot after the current time, at each control processing cycle;

estimated overall motion state trajectory setting element that temporarily determines, at each control processing cycle, an estimated overall motion state trajectory, which is an estimated trajectory of a desired value of an overall motion state of the mobile robot after the current time, such that the set estimated movable link distal end portion trajectory and the set estimated overall momentum trajectory can be attained;

motion acceleration determining element that, at each control processing cycle, carries out arithmetic processing of a solution technique of a secondary plan problem by using a joint motion constraint condition, which is a predetermined constraint condition, which is related to the motion state of each joint of each of the movable links and which is not used in the processing by the estimated overall motion state trajectory determining element, and a predetermined evaluation function related to a predetermined type of state amount of the mobile robot at a plurality of times after the current time so as to calculate motion accelerations of the base body and the distal end portion of each of the movable links at the plurality of times such that a value of the predetermined evaluation function is minimized within a range that satisfies the joint motion constraint condition, thereby determining new desired motion accelerations of the base body and the distal end portion of each of the movable links based on calculated values of the motion accelerations of the base body and the distal end portion of each of the movable links at an initial time among the plurality of times; and desired joint control value determining element that determines a desired control value of each joint of the mobile robot at each control processing cycle such that the determined desired motion accelerations are attained, wherein the predetermined evaluation function is an evaluation function configured such that the value thereof changes according to the degree of agreement between a time series of the predetermined type of state amount at the plurality of times calculated using motion velocities of the base body and the distal end portion of each of the movable links defined by the calculated values of the motion accelerations at the plurality of times and a Jacobian matrix defined by the estimated overall motion state trajectory and a time series of the predetermined type of state amount at the plurality of times defined by the estimated overall motion state trajectory, the joint motion constraint condition is a constraint condition expressed by an inequality that defines a variable range of the motion state of each joint of each of the movable links calculated using the motion velocities of the base body and the distal end portion of each of the movable links defined by the calculated values of the motion accelerations at the plurality of times and the Jacobian matrix defined by the estimated overall motion state trajectory, and each control processing cycle includes a series of arithmetic processing carried out by the estimated movable link distal end portion trajectory setting element, the estimated overall momentum trajectory setting element, the estimated overall motion state trajectory setting element, the motion acceleration determining element, and the desired joint control value determining element.

2. The motion target generating apparatus of a mobile robot according to claim 1, wherein the predetermined type of state amount includes at least the overall momentum of the mobile robot, and the predetermined evaluation function is configured such that the value thereof changes according to a momentum evaluation index value indicative of a degree of agreement between a time series of the overall momentum of the mobile robot at the plurality of times calculated using the motion velocities of the base body and the distal end portion of each of the movable links, which are defined by the calculated values of the motion accelerations at the plurality of times, and a Jacobian matrix defined by the estimated overall motion state trajectory, and a time series of a desired value of the momentum at the plurality of times defined by the estimated overall momentum trajectory.

3. The motion target generating apparatus of a mobile robot according to claim 2, wherein the predetermined type of state amount further includes motion accelerations of the base body and the distal end portion of each of the movable links, and the predetermined evaluation function is configured such that the value thereof changes according to a motion acceleration evaluation index value indicative of a degree of agreement between a time series of the calculated values of the motion accelerations of the base body and the distal end portion of each of the movable links at the plurality of times and a time series of the motion accelerations at the plurality of times defined by the estimated overall motion state trajectory, and the momentum evaluation index value.

4. The motion target generating apparatus of a mobile robot according to claim 2, wherein the estimated overall momentum trajectory setting element includes element that sets an estimated trajectory of a desired ZMP of the mobile robot after the current time, and the overall momentum of the mobile robot that constitutes the predetermined type of state amount includes an angular momentum about a desired ZMP of the mobile robot.

5. The motion target generating apparatus of a mobile robot according to claim 3, wherein the estimated overall momentum trajectory setting element includes element that sets an estimated trajectory of a desired ZMP of the mobile robot after the current time, and the overall momentum of the mobile robot that constitutes the predetermined type of state amount includes an angular momentum about a desired ZMP of the mobile robot.

* * * * *